US012693973B2

(12) United States Patent
Zhuang

(10) Patent No.: US 12,693,973 B2
(45) Date of Patent: Jul. 28, 2026

(54) DECODER, AND MEMORY SYSTEM FOR OBTAINING AN UPDATED POSTERIOR MESSAGES CORRESPONDING TO A NON-ZERO SUB-MATRIX

(71) Applicant: Yangtze Memory Technologies Co., Ltd., Wuhan (CN)

(72) Inventor: Zhiwei Zhuang, Wuhan (CN)

(73) Assignee: YANGTZE MEMORY TECHNOLOGIES CO., LTD., Wuhan (CN)

( * ) Notice: Subject to any disclaimer, the term of this patent is extended or adjusted under 35 U.S.C. 154(b) by 0 days.

(21) Appl. No.: 19/055,977

(22) Filed: Feb. 18, 2025

(65) Prior Publication Data

US 2026/0211809 A1     Jul. 23, 2026

(30) Foreign Application Priority Data

Jan. 22, 2025    (CN) .......................... 202510103731.7

(51) Int. Cl.
*G06F 12/02*          (2006.01)

(52) U.S. Cl.
CPC ................................ *G06F 12/0246* (2013.01)

(58) Field of Classification Search
None
See application file for complete search history.

(56) References Cited

U.S. PATENT DOCUMENTS

| | | | |
|---|---|---|---|
| 4,905,287 A | * | 2/1990 | Segawa ................... G10L 15/00 704/254 |
| 11,455,118 B1 | | 9/2022 | Kong et al. |
| 11,521,701 B2 | | 12/2022 | Chenge et al. |
| 2020/0348932 A1 | | 11/2020 | Zhang et al. |
| 2023/0004297 A1 | | 1/2023 | Wan et al. |
| 2023/0055737 A1 | | 2/2023 | Cheng et al. |
| 2023/0070503 A1 | | 3/2023 | Chen |
| 2023/0103004 A1 | | 3/2023 | Chen |

(Continued)

FOREIGN PATENT DOCUMENTS

| | | | | |
|---|---|---|---|---|
| CN | 105515591 A | * | 4/2016 | |
| CN | 105607721 A | * | 5/2016 | .......... G06F 11/3442 |

(Continued)

*Primary Examiner* — Christopher D Birkhimer
(74) *Attorney, Agent, or Firm* — BAYES PLLC

(57)          ABSTRACT

According to one aspect, a decoder is provided. The decoder may include a first memory and a message updating circuit. The first memory may be configured to store posterior probability messages. The message updating circuit may be configured to sequentially read a posterior probability message corresponding to each non-zero sub-matrix of a current layer from the first memory in a first reading order according to a position of each non-zero sub-matrix of the current layer. The message updating circuit may be configured to obtain an updated posterior probability message corresponding to each non-zero sub-matrix of the current layer based on the posterior probability message corresponding to each non-zero sub-matrix of the current layer in a current iteration. The message updating circuit may be configured to sequentially write the updated posterior probability message corresponding to each non-zero sub-matrix of the current layer into the first memory in a first writing order.

20 Claims, 27 Drawing Sheets

100

(56) References Cited

U.S. PATENT DOCUMENTS

2023/0229318 A1   7/2023  He
2024/0429941 A1   12/2024  Tan et al.

FOREIGN PATENT DOCUMENTS

CN        103488545  B   *   1/2018  ........ H03M 13/1171
CN        105515591  B   *   10/2019
JP        2004309998 A   *   11/2004  ........... G06F 18/295
JP        2004362664 A   *   12/2004
JP        2017111601 A   *   6/2017  .......... G06F 11/0709
KR        20130116014 A  *   10/2013  ........... G06F 3/0671
KR        20130137527 A  *   12/2013  ........ H03M 13/6343
RU        2463783    C2  *   10/2012
TW        I408684    B   *   9/2013  ............. G11C 16/04

* cited by examiner

<u>100</u> variable nodes :

$$
H = \begin{array}{c} \\ \\ \\ \\ \\ \end{array} \overset{\text{V1 V2 V3 V4 V5 V6 V7 V8 V9 V10}}{\begin{bmatrix} 1 & 1 & 1 & 1 & 0 & 1 & 1 & 0 & 0 & 0 \\ 0 & 0 & 1 & 1 & 1 & 1 & 1 & 1 & 0 & 0 \\ 0 & 1 & 0 & 1 & 0 & 1 & 0 & 1 & 1 & 1 \\ 1 & 0 & 1 & 0 & 1 & 0 & 0 & 1 & 1 & 1 \\ 1 & 1 & 0 & 0 & 1 & 0 & 1 & 0 & 1 & 1 \end{bmatrix}} \begin{array}{c} C1 \\ C2 \\ C3 \\ C4 \\ C5 \end{array}
$$

check nodes

FIG. 7 first category operation 1 second category third category the current layer is a non-zero sub-matrix, and the next layer of the current layer is also a non-zero sub-matrix operation 1 first category second category third category the current layer is a non-zero sub-matrix, and the next layer of the current layer is also a non-zero sub-matrix operation 2 first category second category third category the current layer is a non-zero sub-matrix, and the next layer of the current layer is also a non-zero sub-matrix

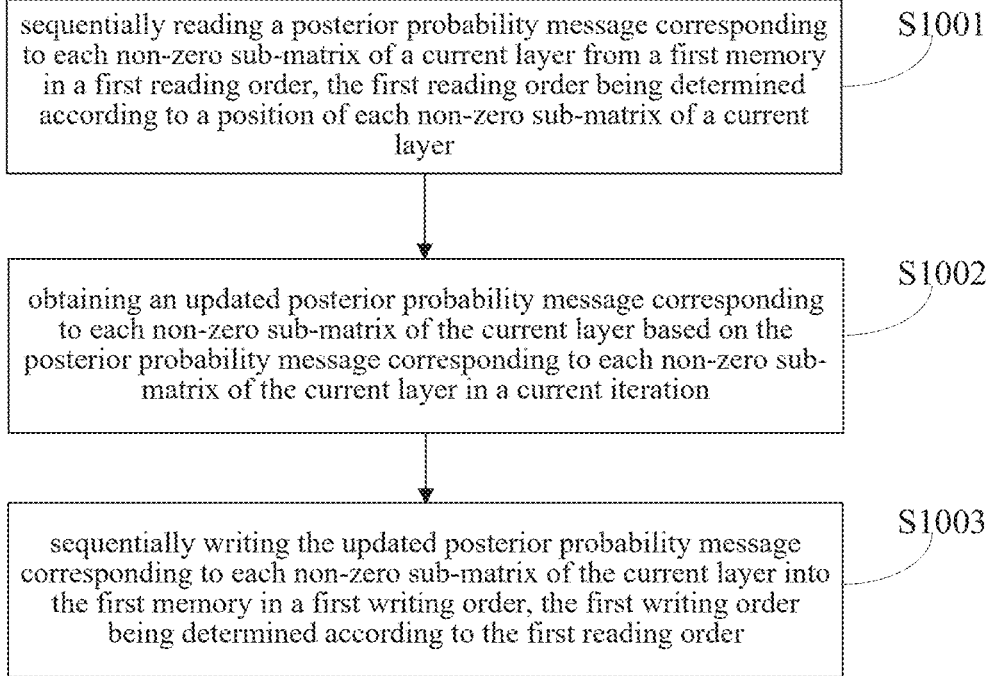

sequentially reading a posterior probability message corresponding to each non-zero sub-matrix of a current layer from a first memory in a first reading order, the first reading order being determined according to a position of each non-zero sub-matrix of a current layer — S1001 obtaining an updated posterior probability message corresponding to each non-zero sub-matrix of the current layer based on the posterior probability message corresponding to each non-zero sub-matrix of the current layer in a current iteration — S1002 sequentially writing the updated posterior probability message corresponding to each non-zero sub-matrix of the current layer into the first memory in a first writing order, the first writing order being determined according to the first reading order — S1003

FIG. 20

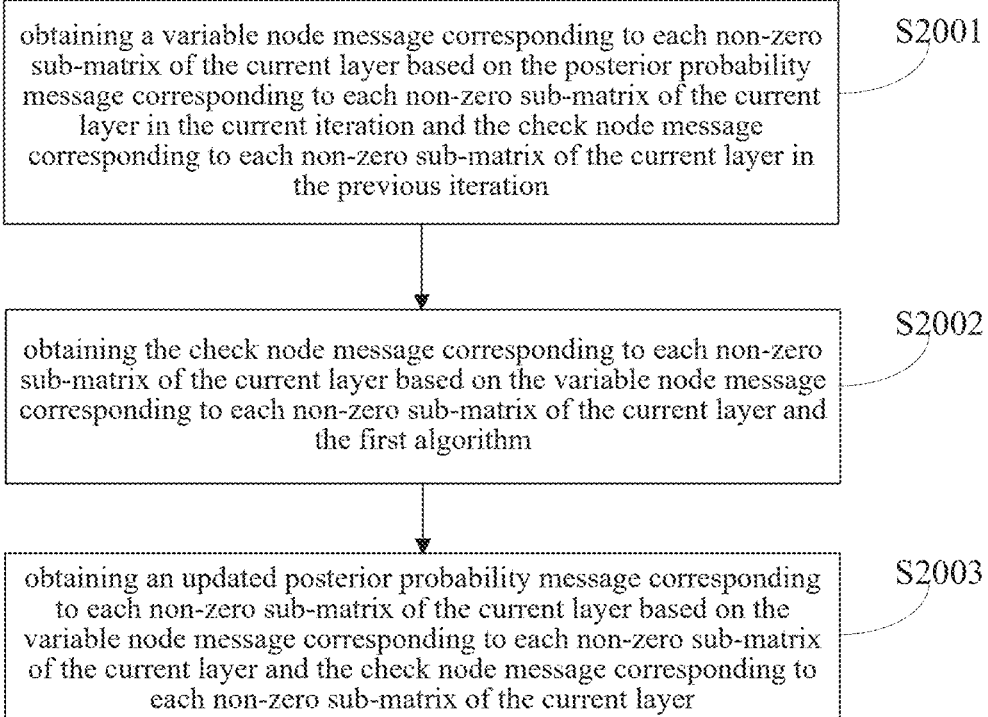

obtaining a variable node message corresponding to each non-zero sub-matrix of the current layer based on the posterior probability message corresponding to each non-zero sub-matrix of the current layer in the current iteration and the check node message corresponding to each non-zero sub-matrix of the current layer in the previous iteration    S2001 obtaining the check node message corresponding to each non-zero sub-matrix of the current layer based on the variable node message corresponding to each non-zero sub-matrix of the current layer and the first algorithm    S2002 obtaining an updated posterior probability message corresponding to each non-zero sub-matrix of the current layer based on the variable node message corresponding to each non-zero sub-matrix of the current layer and the check node message corresponding to each non-zero sub-matrix of the current layer    S2003

FIG. 21

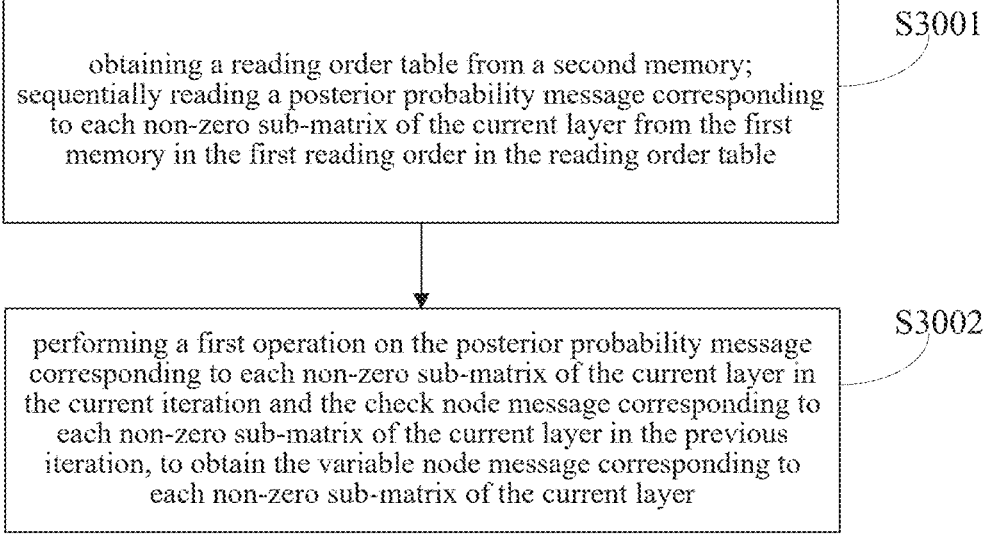

S3001 obtaining a reading order table from a second memory;
sequentially reading a posterior probability message corresponding
to each non-zero sub-matrix of the current layer from the first
memory in the first reading order in the reading order table

S3002 performing a first operation on the posterior probability message
corresponding to each non-zero sub-matrix of the current layer in
the current iteration and the check node message corresponding to
each non-zero sub-matrix of the current layer in the previous
iteration, to obtain the variable node message corresponding to
each non-zero sub-matrix of the current layer

FIG. 22

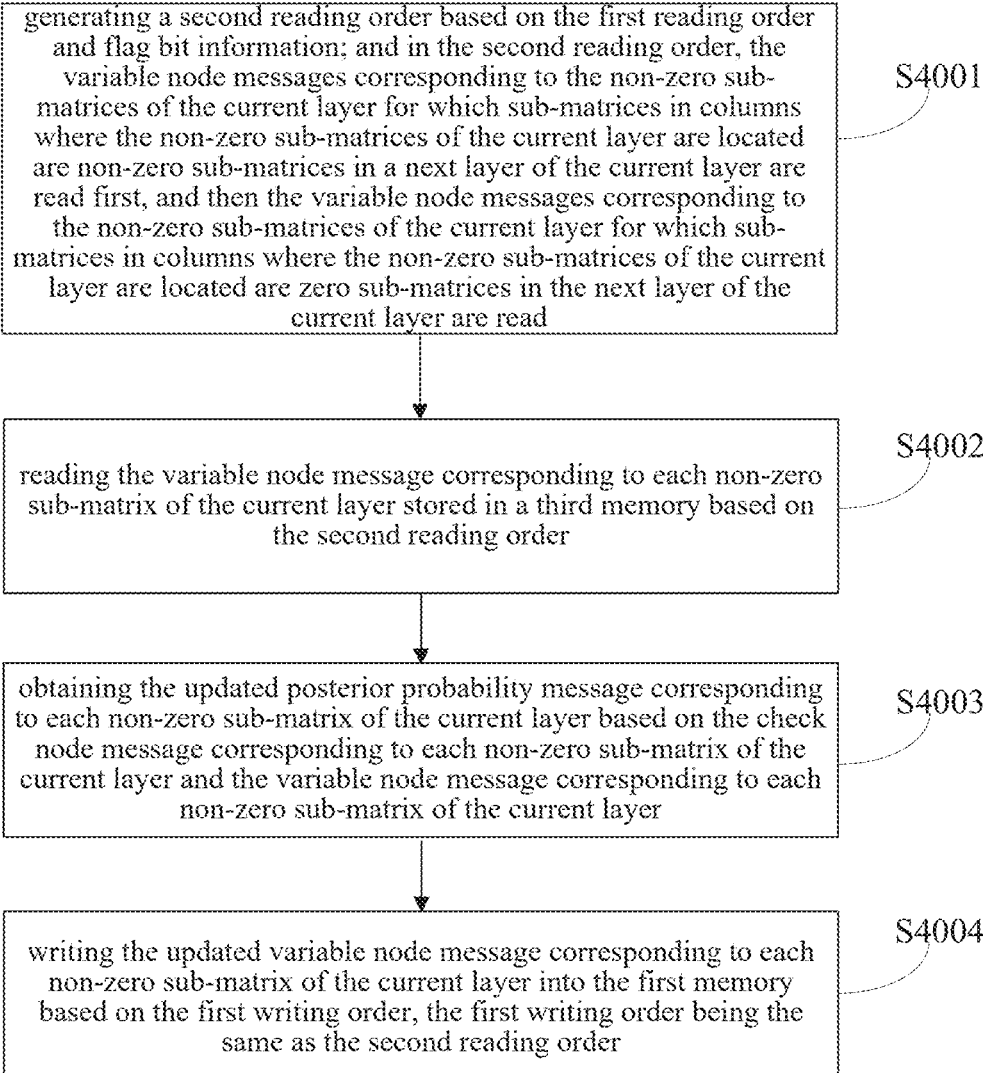

generating a second reading order based on the first reading order and flag bit information; and in the second reading order, the variable node messages corresponding to the non-zero sub-matrices of the current layer for which sub-matrices in columns where the non-zero sub-matrices of the current layer are located are non-zero sub-matrices in a next layer of the current layer are read first, and then the variable node messages corresponding to the non-zero sub-matrices of the current layer for which sub-matrices in columns where the non-zero sub-matrices of the current layer are located are zero sub-matrices in the next layer of the current layer are read

S4001 reading the variable node message corresponding to each non-zero sub-matrix of the current layer stored in a third memory based on the second reading order

S4002 obtaining the updated posterior probability message corresponding to each non-zero sub-matrix of the current layer based on the check node message corresponding to each non-zero sub-matrix of the current layer and the variable node message corresponding to each non-zero sub-matrix of the current layer

S4003 writing the updated variable node message corresponding to each non-zero sub-matrix of the current layer into the first memory based on the first writing order, the first writing order being the same as the second reading order

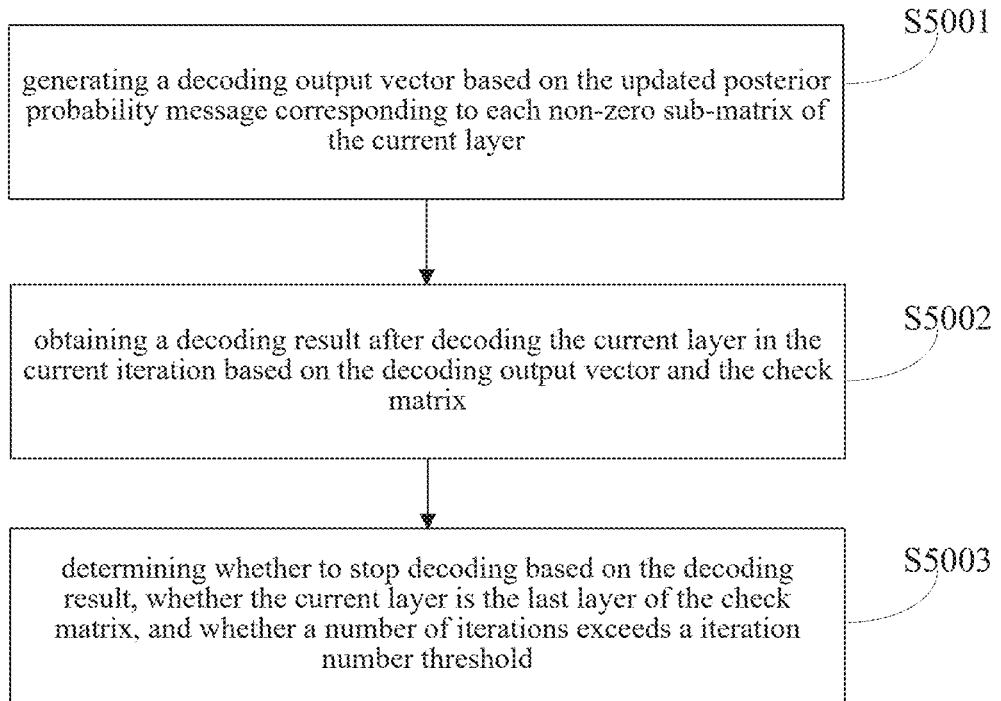

generating a decoding output vector based on the updated posterior probability message corresponding to each non-zero sub-matrix of the current layer
S5001 obtaining a decoding result after decoding the current layer in the current iteration based on the decoding output vector and the check matrix
S5002 determining whether to stop decoding based on the decoding result, whether the current layer is the last layer of the check matrix, and whether a number of iterations exceeds a iteration number threshold
S5003

FIG. 24

DECODER, AND MEMORY SYSTEM FOR OBTAINING AN UPDATED POSTERIOR MESSAGES CORRESPONDING TO A NON-ZERO SUB-MATRIX

CROSS-REFERENCE TO RELATED APPLICATIONS

This application claims the benefit of priority to Chinese Application No. 202510103731.7, filed on Jan. 22, 2025, which is incorporated herein by reference in its entirety.

TECHNICAL FIELD

The present disclosure relates to the field of semiconductor technologies, including but not limited to a decoder, a method of decoding, a memory controller, and a memory system.

BACKGROUND

Memory devices are storage devices in modern information technology for storing information. As a typical non-volatile semiconductor memory, Not-And (NAND) type memories gradually have become mainstream products in the storage market due to high storage density, controllable production cost, and suitable erase speed. However, as the requirements on storage devices continue to increase, memory devices and systems thereof still have significant room for improvement.

SUMMARY

According to one aspect of the present disclosure, a decoder is provided. The decoder may include a first memory. The decoder may include a message updating circuit. The first memory may be configured to store posterior probability messages. The message updating circuit may be configured to sequentially read a posterior probability message corresponding to each non-zero sub-matrix of a current layer from the first memory in a first reading order. The first reading order may be determined according to a position of each non-zero sub-matrix of the current layer. The message updating circuit may be configured to obtain an updated posterior probability message corresponding to each non-zero sub-matrix of the current layer based on the posterior probability message corresponding to each non-zero sub-matrix of the current layer in a current iteration. The message updating circuit may be configured to sequentially write the updated posterior probability message corresponding to each non-zero sub-matrix of the current layer into the first memory in a first writing order. The first writing order may be determined according to the first reading order.

In some implementations, the first reading order may be determined according to a position relationship between each non-zero sub-matrix of the current layer and non-zero sub-matrices of a previous layer of the current layer and a layer before the previous layer of the current layer.

In some implementations, the first writing order may be determined according to the first reading order and a position relationship between each non-zero sub-matrix of the current layer and a non-zero sub-matrix of a next layer of the current layer.

In some implementations, according to a position relationship between the non-zero sub-matrix of each layer and the non-zero sub-matrices of a previous layer and a layer before the previous layer of each layer, the non-zero sub-matrices of each layer may be divided into a first category, a second category, and a third category. In some implementations, in a column where a non-zero sub-matrix in the first category of the current layer is located, both a sub-matrix of the previous layer of the current layer and a sub-matrix of the layer before the previous layer of the current layer may be zero sub-matrices. In some implementations, in a column where a non-zero sub-matrix in the second category of the current layer is located, a sub-matrix of the previous layer of the current layer is a zero sub-matrix, and a sub-matrix of the layer before the previous layer of the current layer may be a non-zero sub-matrix. In some implementations, in a column where a non-zero sub-matrix in the third category of the current layer is located, a sub-matrix of the previous layer of the current layer may be a non-zero sub-matrix. In some implementations, the message updating circuit may be configured to sequentially read posterior probability messages corresponding to non-zero sub-matrices belonging to the first category in the non-zero sub-matrices of the current layer, posterior probability messages corresponding to non-zero sub-matrices belonging to the second category in the non-zero sub-matrices of the current layer, and posterior probability messages corresponding to non-zero sub-matrices belonging to the third category in the non-zero sub-matrices of the current layer from the first memory in the first reading order.

In some implementations, when the posterior probability messages corresponding to the non-zero sub-matrices belonging to the second category in the non-zero sub-matrices of the current layer are read, the message updating circuit may be configured to sequentially read posterior probability messages corresponding to a first portion of the non-zero sub-matrices, posterior probability messages corresponding to a second portion of the non-zero sub-matrices, and posterior probability messages corresponding to a third portion of the non-zero sub-matrices from the first memory. In some implementations, in columns where the first portion of the non-zero sub-matrices are located, the non-zero sub-matrices of the layer before the previous layer of the current layer may belong to the first category. In some implementations, in columns where the second portion of the non-zero sub-matrices are located, the non-zero sub-matrices of the layer before the previous layer of the current layer may belong to the second category. In some implementations, in columns where the third portion of the non-zero sub-matrices are located, the non-zero sub-matrices of the layer before the previous layer of the current layer may belong to the third category. In some implementations, when the posterior probability messages corresponding to the non-zero sub-matrices belonging to the third category in the non-zero sub-matrices of the current layer are read, the message updating circuit may be configured to sequentially read posterior probability messages corresponding to a fourth portion of the non-zero sub-matrices, posterior probability messages corresponding to a fifth portion of the non-zero sub-matrices, and posterior probability messages corresponding to a sixth portion of the non-zero sub-matrices from the first memory. In some implementations, in columns where the fourth portion of the non-zero sub-matrices are located, the non-zero sub-matrices of the previous layer of the current layer may belong to the first category. In some implementations, in columns where the fifth portion of the non-zero sub-matrices are located, the non-zero sub-matrices of the previous layer of the current layer may belong to the second category. In some implementations, in columns where the sixth portion of the non-zero sub-matrices are located, the non-zero sub-matrices of the previous layer of the current layer may belong to the third category.

In some implementations, the message updating circuit may be configured to sequentially write, into the first memory, a message. In some implementations, the message may include posterior probability messages corresponding to non-zero sub-matrices of the current layer for which in columns where the non-zero sub-matrices of the current layer is located, sub-matrices in a next layer of the current layer are non-zero sub-matrices. In some implementations, the message may include posterior probability messages corresponding to non-zero sub-matrices of the current layer for which in columns where the non-zero sub-matrices of the current layer are located, sub-matrices in the next layer of the current layer are zero sub-matrices.

In some implementations, the message updating circuit may be configured to obtain the updated posterior probability message corresponding to each non-zero sub-matrix of the current layer based on the posterior probability message corresponding to each non-zero sub-matrix of the current layer in the current iteration and a check node message corresponding to each non-zero sub-matrix of the current layer in a previous iteration.

In some implementations, the message updating circuit may include a variable node message processing circuit. In some implementations, the message updating circuit may include a check node message processing circuit. In some implementations, the message updating circuit may include a posterior probability message processing circuit. In some implementations, the variable node message processing circuit may be configured to sequentially read the posterior probability message corresponding to each non-zero sub-matrix of the current layer from the first memory in the first reading order. In some implementations, the variable node message processing circuit may be configured to obtain a variable node message corresponding to each non-zero sub-matrix of the current layer based on the posterior probability message corresponding to each non-zero sub-matrix of the current layer in the current iteration and the check node message corresponding to each non-zero sub-matrix of the current layer in the previous iteration. In some implementations, the check node message processing circuit may be configured to obtain the check node message corresponding to each non-zero sub-matrix of the current layer based on the variable node message corresponding to each non-zero sub-matrix of the current layer and a first algorithm. In some implementations, the posterior probability message processing circuit may be configured to obtain the updated posterior probability message corresponding to each non-zero sub-matrix of the current layer based on the variable node message corresponding to each non-zero sub-matrix of the current layer and the check node message corresponding to each non-zero sub-matrix of the current layer. In some implementations, the posterior probability message processing circuit may be configured to sequentially write the updated posterior probability message corresponding to each non-zero sub-matrix of the current layer into the first memory in the first writing order.

In some implementations, the first algorithm may include a Sum-Product Algorithm and a Min-Sum Algorithm.

In some implementations, the decoder may include a second memory. In some implementations, the variable node message processing circuit may include a first control circuit, a third memory, and a variable node message updating circuit. In some implementations, the first control circuit may be configured to obtain a reading order table from the second memory. In some implementations, the first control circuit may be configured to sequentially read a posterior probability message corresponding to each non-zero sub-matrix of the current layer from the first memory in the first reading order in the reading order table. In some implementations, the variable node message updating circuit may be configured to perform a first operation on the posterior probability message corresponding to each non-zero sub-matrix of the current layer in the current iteration and the check node message corresponding to each non-zero sub-matrix of the current layer in the previous iteration, to obtain the variable node message corresponding to each non-zero sub-matrix of the current layer. In some implementations, the third memory may be configured to store the variable node message corresponding to each non-zero sub-matrix of the current layer.

In some implementations, the second memory may be configured to store flag bit information. In some implementations, the flag bit information may be configured to indicate in a column where each non-zero sub-matrix of the current layer is located, whether a sub-matrix of a next layer of the current layer is a non-zero sub-matrix. In some implementations, the posterior probability message processing circuit may include an address updating circuit, a second control circuit, a posterior probability updating circuit and a third control circuit. In some implementations, the address updating circuit may be configured to generate a second reading order based on the first reading order and the flag bit information. In some implementations, in the second reading order, variable node messages corresponding to non-zero sub-matrices of the current layer for which in columns where the non-zero sub-matrices of the current layer may be located sub-matrices of the next layer of the current layer are non-zero sub-matrices are read first. In some implementations, variable node messages corresponding to non-zero sub-matrices of the current layer for which in columns where the non-zero sub-matrices of the current layer are located sub-matrices of the next layer of the current layer are zero sub-matrices may be read. In some implementations, the second control circuit may be configured to read the variable node message corresponding to each non-zero sub-matrix of the current layer stored in the third memory based on the second reading order. In some implementations, the posterior probability updating circuit may be configured to obtain the updated posterior probability message corresponding to each non-zero sub-matrix of the current layer based on the check node message corresponding to each non-zero sub-matrix of the current layer and the variable node message corresponding to each non-zero sub-matrix of the current layer. In some implementations, the third control circuit may be configured to write the updated posterior probability message corresponding to each non-zero sub-matrix of the current layer into the first memory based on the first writing order; the first writing order is the same as the second reading order.

In some implementations, the decoder may further include a hard decision circuit. In some implementations, the hard decision circuit may be configured to generate a decoding output vector based on the updated posterior probability message corresponding to each non-zero sub-matrix of the current layer. In some implementations, the hard decision circuit may be configured to obtain a decoding result after decoding the current layer in the current iteration based on the decoding output vector and the check matrix. In some implementations, the hard decision circuit may be configured to determine whether to stop decoding based on the decoding result, whether the current layer is the last layer of the check matrix, and whether a number of iterations exceeds an iteration number threshold.

In some implementations, the hard decision circuit may be configured to determine, based on a first posterior probability message in the updated posterior probability messages corresponding to each non-zero sub-matrix of the current layer being greater than or equal to 0, that an element in the decoding output vector corresponding to the first posterior probability message is 0. In some implementations, the hard decision circuit may be configured to determine, according to the first posterior probability message in the posterior probability messages corresponding to each non-zero sub-matrix of the current layer being less than 0, that an element in the decoding output vector corresponding to the first posterior probability message is 1. In some implementations, the hard decision circuit may be configured to perform a second operation on the decoding output vector and a transposed matrix of the check matrix to obtain a decoding result after decoding the current layer in the current iteration. In some implementations, the hard decision circuit may be configured to stop decoding based on the decoding result being 0 or a current number of iterations being equal to the iteration number threshold and the current layer being the last layer of the check matrix.

According to another aspect of the present disclosure, a memory controller is provided. The memory controller may include a processor configured to receive information of a first reading order. The memory controller may include a decoder. The decoder may include a first memory. The decoder may include a message updating circuit. The first memory may be configured to store posterior probability messages. The message updating circuit may be configured to sequentially read, from the first memory, a posterior probability message corresponding to each non-zero sub-matrix of a current layer according to the first reading order provided in the information of the first reading order. The message updating circuit may be configured to obtain an updated posterior probability message corresponding to each non-zero sub-matrix of the current layer based on the posterior probability message corresponding to each non-zero sub-matrix of the current layer in a current iteration. The message updating circuit may be configured to sequentially write the updated posterior probability message corresponding to each non-zero sub-matrix of the current layer into the first memory in a first writing order. The first writing order may be determined according to the first reading order.

According to a further aspect of the present disclosure, a memory system is provided. The memory system may include a memory device configured to output read data. The memory system may include a decoder. The decoder may include a first memory. The decoder may include a message updating circuit. The first memory may be configured to store posterior probability messages. The message updating circuit may be configured to sequentially read a posterior probability message corresponding to each non-zero sub-matrix of a current layer from the first memory in a first reading order, the first reading order being determined according to a position of each non-zero sub-matrix of the current layer. The message updating circuit may be configured to obtain an updated posterior probability message corresponding to each non-zero sub-matrix of the current layer based on the posterior probability message corresponding to each non-zero sub-matrix of the current layer in a current iteration. The message updating circuit may be configured to sequentially write the updated posterior probability message corresponding to each non-zero sub-matrix of the current layer into the first memory in a first writing order, the first writing order being determined according to the first reading order. The decoder may be configured to decode a codeword to be decoded in the read data.

In some implementations, the memory system may include an encoder configured to receive write data and encode the write data. In some implementations, the memory device may be further configured to receive the encoded write data.

According to yet another aspect of the present disclosure, a method of decoding is provided. The method may include sequentially reading a posterior probability message corresponding to each non-zero sub-matrix of a current layer from a first memory in a first reading order, the first reading order being determined according to a position of each non-zero sub-matrix of a current layer. The method may include obtaining an updated posterior probability message corresponding to each non-zero sub-matrix of the current layer based on the posterior probability message corresponding to each non-zero sub-matrix of the current layer in a current iteration. The method may include sequentially writing the updated posterior probability message corresponding to each non-zero sub-matrix of the current layer into the first memory in a first writing order, the first writing order being determined according to the first reading order.

In some implementations, the first reading order may be determined according to a position relationship between each non-zero sub-matrix of the current layer and non-zero sub-matrices of a previous layer of the current layer and a layer before the previous layer of the current layer.

In some implementations, the first writing order may be determined according to the first reading order and a position relationship between each non-zero sub-matrix of the current layer and a non-zero sub-matrix of a next layer of the current layer.

In some implementations, according to a position relationship between the non-zero sub-matrix of each layer and the non-zero sub-matrices of the previous layer and a layer before the previous layer of each layer, the non-zero sub-matrices of each layer may be divided into a first category, a second category, and a third category. In some implementations, in a column where a non-zero sub-matrix in the first category of the current layer is located, both a sub-matrix of the previous layer of the current layer and a sub-matrix of the layer before the previous layer of the current layer may be zero sub-matrices. In some implementations, in a column where a non-zero sub-matrix in the second category of the current layer is located, a sub-matrix of the previous layer of the current layer may be the zero sub-matrix, and a sub-matrix of the layer before the previous layer of the current layer may be a non-zero sub-matrix. In some implementations, in a column where a non-zero sub-matrix in the third category of the current layer is located, a sub-matrix of the previous layer of the current layer may be a non-zero sub-matrix. In some implementations, the sequentially reading the posterior probability message corresponding to each non-zero sub-matrix of the current layer from the first memory in the first reading order may include sequentially reading posterior probability messages corresponding to non-zero sub-matrices belonging to the first category in the non-zero sub-matrices of the current layer, posterior probability messages corresponding to non-zero sub-matrices belonging to the second category in the non-zero sub-matrices of the current layer, and posterior probability messages corresponding to non-zero sub-matrices belonging to the third category in the non-zero sub-matrices of the current layer from the first memory in the first reading order.

In some implementations, reading posterior probability messages corresponding to the non-zero sub-matrices belonging to the second category in the non-zero sub-matrices of the current layer from the first memory may include sequentially reading posterior probability messages corresponding to a first portion of the non-zero sub-matrices, posterior probability messages corresponding to a second portion of the non-zero sub-matrices, and posterior probability messages corresponding to a third portion of the non-zero sub-matrices from the first memory. In some implementations, in columns where the first portion of the non-zero sub-matrices are located, the non-zero sub-matrices of the layer before the previous layer of the current layer may belong to the first category. In some implementations, in columns where the second portion of the non-zero sub-matrices are located, the non-zero sub-matrices of the layer before the previous layer of the current layer may belong to the second category. In some implementations, in columns where the third portion of the non-zero sub-matrices are located, the non-zero sub-matrices of the layer before the previous layer of the current layer may belong to the third category. In some implementations, reading posterior probability messages corresponding to the non-zero sub-matrices belonging to the third category in the non-zero sub-matrices of the current layer from the first memory may include sequentially reading posterior probability messages corresponding to a fourth portion of the non-zero sub-matrices, posterior probability messages corresponding to a fifth portion of the non-zero sub-matrices, and posterior probability messages corresponding to a sixth portion of the non-zero sub-matrices from the first memory. In some implementations, in columns where the fourth portion of the non-zero sub-matrices are located, the non-zero sub-matrices of the previous layer of the current layer may belong to the first category. In some implementations, in columns where the fifth portion of the non-zero sub-matrices are located, the non-zero sub-matrices of the previous layer of the current layer may belong to the second category. In some implementations, in columns where the sixth portion of the non-zero sub-matrices are located, the non-zero sub-matrices of the previous layer of the current layer may belong to the third category.

In some implementations, the sequentially writing the updated posterior probability message corresponding to each non-zero sub-matrix of the current layer into the first memory in the first writing order may include sequentially writing, into the first memory, messages. In some implementations, the messages may include posterior probability messages corresponding to non-zero sub-matrices of the current layer for which in columns where the non-zero sub-matrices of the current layer is located, sub-matrices in a next layer of the current layer are non-zero sub-matrices. In some implementations, the messages may include posterior probability messages corresponding to non-zero sub-matrices of the current layer for which in columns where the non-zero sub-matrices of the current layer are located, sub-matrices in the next layer of the current layer are zero sub-matrices.

In some implementations, the obtaining the updated posterior probability message corresponding to each non-zero sub-matrix of the current layer based on the posterior probability message corresponding to each non-zero sub-matrix of the current layer in the current iteration may include obtaining the updated posterior probability message corresponding to each non-zero sub-matrix of the current layer based on the posterior probability message corresponding to each non-zero sub-matrix of the current layer in the current iteration and a check node message corresponding to each non-zero sub-matrix of the current layer in a previous iteration.

In some implementations, the obtaining the updated posterior probability message corresponding to each non-zero sub-matrix of the current layer based on the posterior probability message corresponding to each non-zero sub-matrix of the current layer in the current iteration and the check node message corresponding to each non-zero sub-matrix of the current layer in the previous iteration may include obtaining a variable node message corresponding to each non-zero sub-matrix of the current layer based on the posterior probability message corresponding to each non-zero sub-matrix of the current layer in the current iteration and the check node message corresponding to each non-zero sub-matrix of the current layer in the previous iteration. In some implementations, the obtaining the updated posterior probability message corresponding to each non-zero sub-matrix of the current layer based on the posterior probability message corresponding to each non-zero sub-matrix of the current layer in the current iteration and the check node message corresponding to each non-zero sub-matrix of the current layer in the previous iteration may include obtaining the check node message corresponding to each non-zero sub-matrix of the current layer based on the variable node message corresponding to each non-zero sub-matrix of the current layer and a first algorithm. In some implementations, the obtaining the updated posterior probability message corresponding to each non-zero sub-matrix of the current layer based on the posterior probability message corresponding to each non-zero sub-matrix of the current layer in the current iteration and the check node message corresponding to each non-zero sub-matrix of the current layer in the previous iteration may include obtaining the updated posterior probability message corresponding to each non-zero sub-matrix of the current layer based on the variable node message corresponding to each non-zero sub-matrix of the current layer and the check node message corresponding to each non-zero sub-matrix of the current layer.

In some implementations, the obtaining the updated variable node message corresponding to each non-zero sub-matrix of the current layer based on the posterior probability message corresponding to each non-zero sub-matrix of the current layer in the current iteration and the check node message corresponding to each non-zero sub-matrix of the current layer in the previous iteration may include obtaining a reading order table from a second memory. In some implementations, the obtaining the updated variable node message corresponding to each non-zero sub-matrix of the current layer based on the posterior probability message corresponding to each non-zero sub-matrix of the current layer in the current iteration and the check node message corresponding to each non-zero sub-matrix of the current layer in the previous iteration may include sequentially reading a posterior probability message corresponding to each non-zero sub-matrix of the current layer from the first memory in the first reading order in the reading order table. In some implementations, the obtaining the updated variable node message corresponding to each non-zero sub-matrix of the current layer based on the posterior probability message corresponding to each non-zero sub-matrix of the current layer in the current iteration and the check node message corresponding to each non-zero sub-matrix of the current layer in the previous iteration may include performing a first operation on the posterior probability message corresponding to each non-zero sub-matrix of the current layer in the current iteration and the check node message corresponding to each non-zero sub-matrix of the current layer in the previous iteration, to obtain the variable node message corresponding to each non-zero sub-matrix of the current layer.

In some implementations, the obtaining the updated posterior probability message corresponding to the current layer based on the variable node message corresponding to the current layer and the check node message corresponding to the current layer may include generating a second reading order based on the first reading order and flag bit information. In some implementations, in the second reading order, variable node messages corresponding to non-zero sub-matrices of the current layer for which in columns where the non-zero sub-matrices of the current layer are located sub-matrices of the next layer of the current layer are non-zero sub-matrices may be read first. In some implementations, variable node messages corresponding to non-zero sub-matrices of the current layer for which in columns where the non-zero sub-matrices of the current layer are located sub-matrices of the next layer of the current layer are zero sub-matrices may be read. In some implementations, the obtaining the updated posterior probability message corresponding to the current layer based on the variable node message corresponding to the current layer and the check node message corresponding to the current layer may include reading the variable node message corresponding to each non-zero sub-matrix of the current layer stored in a third memory based on the second reading order. In some implementations, the obtaining the updated posterior probability message corresponding to the current layer based on the variable node message corresponding to the current layer and the check node message corresponding to the current layer may include obtaining the updated posterior probability message corresponding to each non-zero sub-matrix of the current layer based on the check node message corresponding to each non-zero sub-matrix of the current layer and the variable node message corresponding to each non-zero sub-matrix of the current layer. In some implementations, the obtaining the updated posterior probability message corresponding to the current layer based on the variable node message corresponding to the current layer and the check node message corresponding to the current layer may include writing the updated variable node message corresponding to each non-zero sub-matrix of the current layer into the first memory based on the first writing order, the first writing order being the same as the second reading order.

In some implementations, the method may include generating a decoding output vector based on the updated posterior probability message corresponding to each non-zero sub-matrix of the current layer. In some implementations, the method may include obtaining a decoding result after decoding the current layer in the current iteration based on the decoding output vector and a check matrix. In some implementations, the method may include determining whether to stop decoding based on the decoding result, whether the current layer is the last layer of the check matrix, and whether a number of iterations exceeds an iteration number threshold.

In the example of the present disclosure, when layered iterative decoding is performed, a posterior probability message corresponding to each non-zero sub-matrix of a current layer is sequentially read from the first memory in a first reading order, an updated posterior probability message corresponding to each non-zero sub-matrix of the current layer is sequentially written into the first memory in a first writing order, and the first writing order is determined according to the first reading order. In the example of the present disclosure, by optimizing the reading and writing order of the intra-layer posterior probability message, the read-write conflict of the inter-layer posterior probability message can be avoided, such that the idle time can be effectively reduced, and the decoding efficiency is improved.

BRIEF DESCRIPTION OF DRAWINGS

FIG. 7 is an LDPC code check matrix according to an example of the present disclosure.

FIG. 20 is a first schematic flowchart of a decoding process according to an example of the present disclosure.

FIG. 21 is a second schematic flowchart of a decoding process according to an example of the present disclosure.

FIG. 22 is a third schematic flowchart of a decoding process according to an example of the present disclosure.

FIG. 23 is a fourth schematic flowchart of a decoding process according to an example of the present disclosure.

FIG. 24 is a fifth schematic flowchart of a decoding process according to an example of the present disclosure.

DETAILED DESCRIPTION

Figure 1:
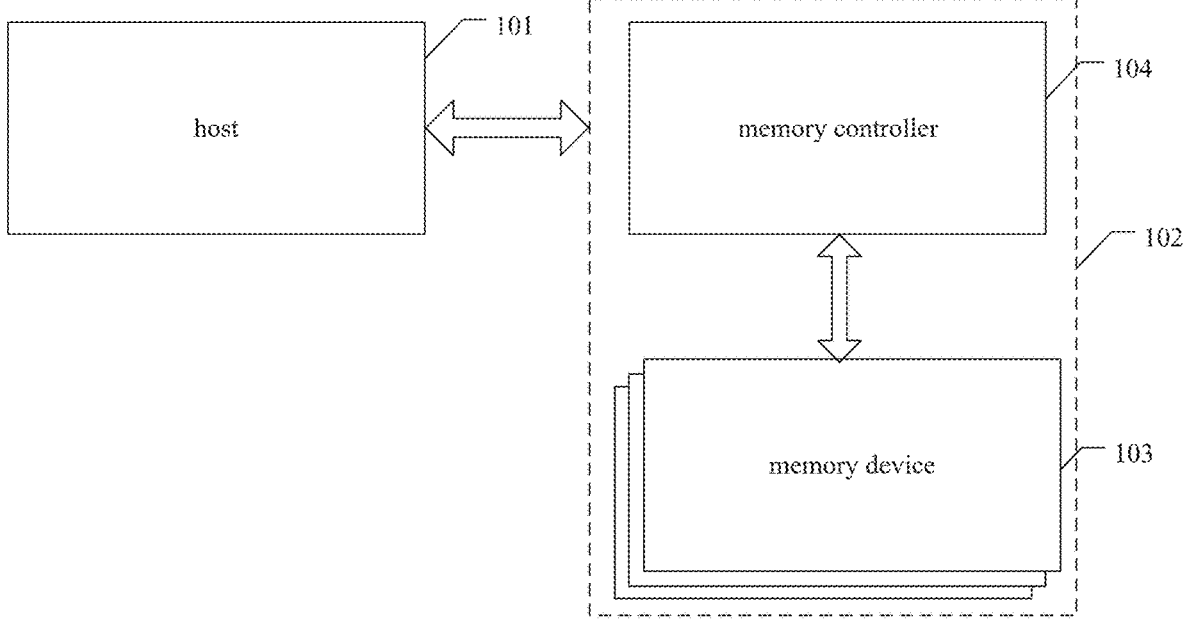
FIG. 1 is a first schematic diagram of an example system having a memory system according to an example of the present disclosure.

Example aspects disclosed in the present disclosure will be described in more detail below with reference to the accompanying drawings. Although example aspects of the present disclosure are shown in the accompanying drawings, it should be understood that the present disclosure may be implemented in various forms and should not be limited to the aspects set forth herein. Rather, these aspects are provided so that the present disclosure can be more thoroughly understood and the scope disclosed in the present disclosure can be fully conveyed to those skilled in the art.

In the following description, numerous details are given in order to provide a more thorough understanding of the present disclosure. However, it will be apparent to one skilled in the art that, the present disclosure may be practiced without one or more of these details. In other examples, in order to avoid confusion with the present disclosure, some technical features known in the art are not described; that is, not all features of the actual examples are described here, and well-known functions and structures are not described in detail.

In the drawings, like reference numerals refer to like elements throughout.

It should be understood that spatial relation terms such as "beneath," "below," "lower," "under", "above," "upper," etc., may be used herein for ease of description to describe the relationship between one element or feature and other elements or features shown in the figures. It should be appreciated that, in addition to the orientations shown in the figures, the spatial-relation terms intent to also comprise different orientations of the devices in use and operation. For example, if the devices in the figures are flipped, then described as "below" or "under" or "beneath" other elements or features will be oriented "on" other elements or features. Thus, the example terms "below" and "beneath" may comprise both upper and lower orientations. The devices may be additionally oriented (rotated 90 degrees or other orientations) and the spatial description terminology used herein is interpreted accordingly.

A term used herein is for the purpose of describing a particular example only and is not to be considered as limitation of the present disclosure. As used herein, "a", "an" and "said/the" in the singular form are intended to comprise the plural forms as well, unless the context indicated clearly otherwise. It should also be understood that the terms at least one of "consists of" or "comprising", when used in this description, identify the presence of at least one of stated features, integers, steps, operations, elements or components, but do not exclude the presence and addition of at least one of one or more other features, integers, steps, operations, elements, components or groups. As used herein, the term "at least one of" comprises any and all combinations of the related listed items.

In order to improve the reliability of data transmission and data storage, error-correcting code (ECC) technology has been widely used in the fields of communications (e.g., wireless communication and optical fiber communication)

and data storage (e.g., a memory system). In various error-correcting codes, a Low Density Parity-Check (LDPC) code is a sparse matrix-based parallel iterative decoding algorithm, which has the performance of approximating Shannon limit, it is simple to code and can perform parallel operation, and has become one of the most widely used error-correcting codes.

As a typical non-volatile semiconductor memory, NAND-type memory gradually become mainstream products in the storage market due to high storage density, controllable production cost, and suitable speed for writing and erasing. In a process of transferring and storing data in a NAND-type memory, errors of data may be caused due to hardware faults, software faults, hard disk errors, or the like of the memory. To ensure the integrity of user data, LDPC codes may be used to perform error detection and correction on data stored in a memory system including NAND-type memory. Hereinafter, the memory system according to the present disclosure will be described by taking a memory system comprising a three-dimensional NAND-type memory as an example.

FIG. 1 is a schematic diagram of an example system having a memory system according to an example of the present disclosure. In an example of the present disclosure, the system 100 may be a mobile phone, a desktop computer, a laptop computer, a tablet computer, a vehicle computer, a game console, a printer, a positioning device, a wearable electronic device, a smart sensor, a virtual reality (VR) device, an augmented reality (AR) device, or any other suitable electronic device having a memory therein. As shown in FIG. 1, the system 100 may comprise a host 101 and a memory system 102, which may comprise one or more memory devices 103 and a memory controller 104. The host 101 may comprise a processor of an electronic device, for example, a central processing unit (CPU), or a system on a chip (SoC), for example, an application processor (AP). The host 101 may be configured to transmit data to the memory system 102 or receive data from the memory system 102.

In some aspects, the memory controller 104 is coupled to the memory device 103, and the host 101 and is configured to control the memory device 103. The memory controller 104 may manage data stored in the memory device 103 and communicate with the host 101. In some examples, the memory controller 104 is designed to operate in a low duty-cycle environment, such as in a secure digital card, compact flash card (CFC), universal serial bus (USB) flash drive, or to operate in other medium for use in electronic devices such as personal computers, digital cameras, mobile phones, or the like. In other aspects, the memory controller 104 is designed to operate in a high duty cycle environment, such as in a solid state disk or embedded multi-media card (eMMC).

In some examples, the memory controller 104 and the one or more memory devices 103 may be integrated into various types of storage devices; that is, the memory system 102 may be implemented and packaged into different types of terminal electronics.

Figure 2:
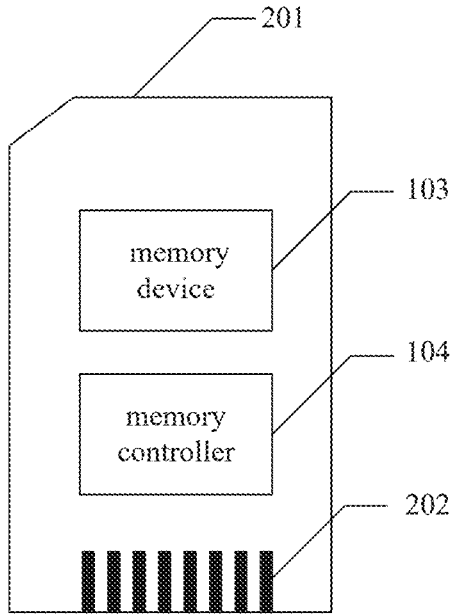
FIG. 2 is a schematic diagram of an example memory card having a memory system according to an example of the present disclosure.
Figure 3:
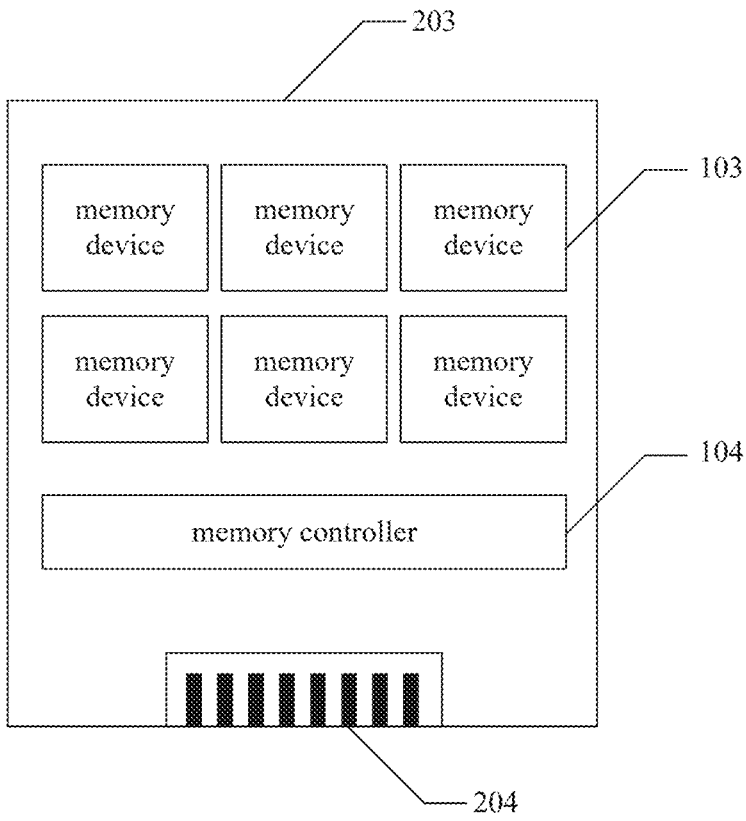
FIG. 3 is a schematic diagram of an example solid state drive with a memory system according to an example of the present disclosure.

In one example as shown in FIG. 2, the memory controller 104 and the single memory device 103 may be integrated into the memory card 201. The memory card 201 may comprise one of a compact flash memory card, a smart media card (SMC), a memory stick (MS), a multi-media card (MMC), for example, an RS-MMC, an MMCmicro, an eMMC, or the like, a secure digital card, for example, a Mini SD card, a Micro SD card, an SDHC card, or the like, and a universal flash memory card. The memory card 201 may also comprise a memory card connector 202 that couples the memory card 201 with a host-side device (e.g., host 101 in FIG. 1). In another example, as shown in FIG. 3, the memory controller 104 and a plurality of memory devices 103 may be integrated into SSD 203. SSD 203 may also comprise an SSD connector 204 that couples SSD 203 with a host-side device (e.g., host 101 in FIG. 1). In some aspects, at least one of the storage capacity or operating speed of SSD 203 is greater than at least one of the storage capacity or operating speed of memory card 201.

Figure 4:
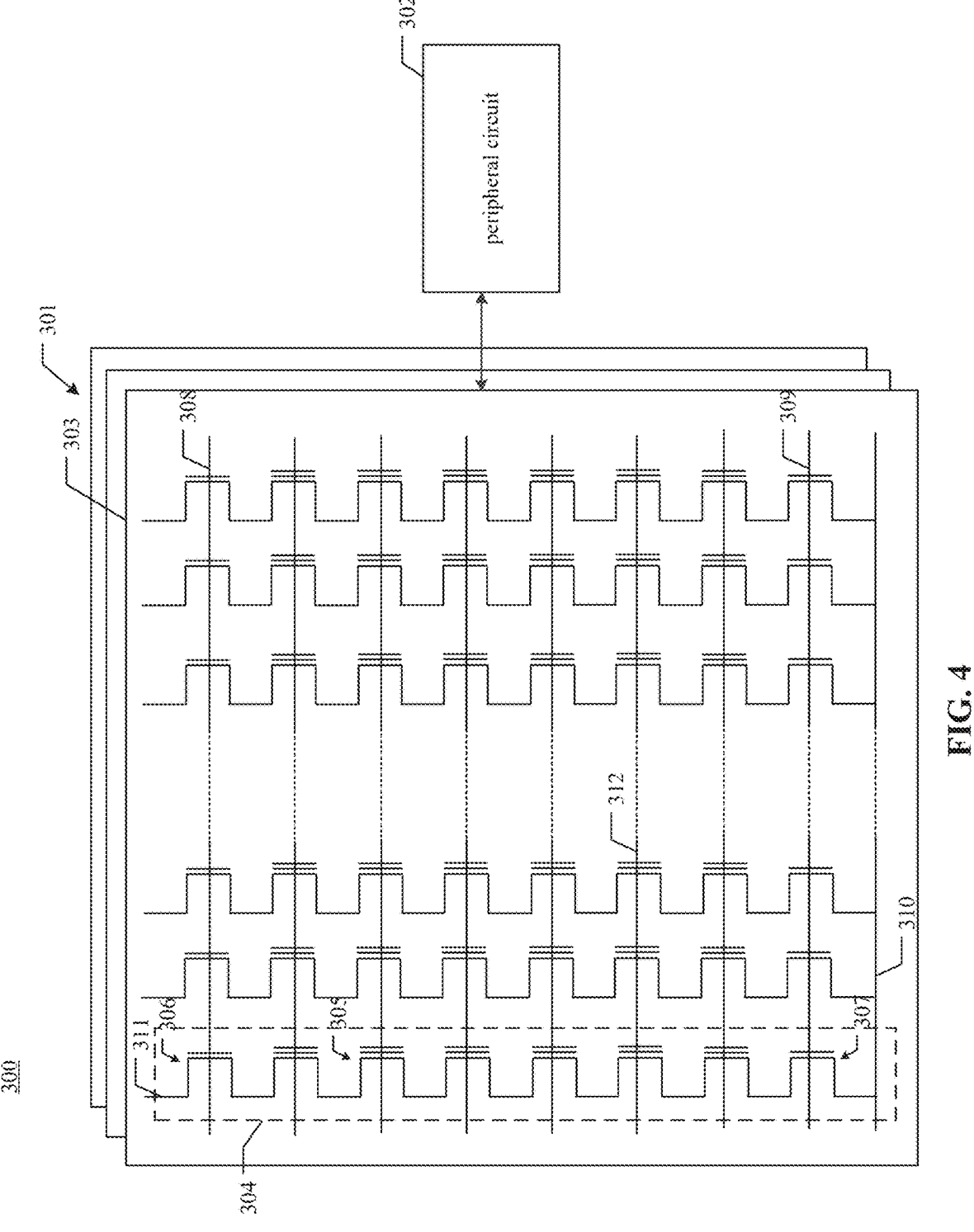
FIG. 4 is a schematic diagram of an example memory device comprising a peripheral circuit according to an example of the present disclosure.

FIG. 4 is a schematic circuit diagram of an example memory device 300 comprising a peripheral circuit according to an example of the present disclosure. The memory device 300 may be an example of the memory device 103 in FIG. 1. The memory device 300 may comprise a memory array 301 and a peripheral circuit 302 coupled to the memory array 301. Taking the memory array 301 as a three-dimensional NAND type memory array as an example for description, wherein the memory cell 305 is a NAND memory cell, the memory cell 305 is provided in the form of an array of memory cell strings 304, and each memory cell string 304 extends vertically above a substrate (not shown). In some aspects, each memory cell string 304 comprises a plurality of memory cells 305 coupled in series and stacked vertically. Each memory cell 305 may maintain a continuous analog value, e.g., voltage or charge, which depends on the number of electrons trapped within a region of memory cell 305. Each memory cell 305 can be either a floating gate type of memory cell comprising a floating-gate transistor or a charge trap type of memory cell comprising a charge-trap transistor.

In some aspects, each memory cell 305 is a single level cell (SLC) having two possible memory states and thus may store one bit of data. For example, the first memory state "0" may correspond to a first voltage range and the second memory state "1" may correspond to a second voltage range. In some aspects, each memory cell 305 is a multi-level cell capable of storing more than a single bit of data in four or more memory states, e.g., a multi-level cell (MLC) storing two bits per cell, a triple level cell (TLC) storing three bits per cell, or a quad-level cell (QLC) storing four bits per cell.

As shown in FIG. 4, each memory cell string 304 may comprise a bottom select transistor (BST) 307 at its source terminal and a top select transistor (TST) 306 at its drain terminal. The bottom select transistor 307 and the top select transistor 306 may be configured to activate the selected memory cell string 304 during read and programming operations. In some aspects, the sources of the memory cell strings 304 in the same memory block 303 may be coupled through a common source line (CSL) 310. In other words, all the memory cell strings 304 in the same memory block 303 have an array common source (ACS). According to some aspects, the top select transistor 306 of each memory cell string 304 is coupled to a respective bit line (BL) 311 from which data can be read or written via an output bus (not shown). In some aspects, each memory cell string 304 is configured to be selected or deselected by at least one of: applying a select voltage (e.g., a voltage higher than a threshold voltage of the top select transistor 306) or a deselect voltage (e.g., OV) to a top select gate (TSG) of the respective top select transistor 306 through one or more top select lines (TSL) 308 or applying a select voltage (e.g., a voltage higher than a threshold voltage of the bottom select transistor 307) or a deselect voltage (e.g., OV) to a bottom select gate (BSG) of the respective bottom select transistor 307 through one or more bottom select lines (BSL) 309.

As shown in FIG. 4, the memory cell string 304 may be organized into a plurality of memory blocks 303, each of which may have a common source line 310. In some aspects, each memory block 303 is a basic data unit for an erase operation, e.g., all memory cells 305 on the same memory block 303 are erased simultaneously. To erase the memory cells 305 in the selected memory block, a common source line 310 coupled to the selected memory block and an unselected memory block in the same side as the selected memory block may be biased with an erase voltage. It should be understood that in some examples, erase operations may be performed at a half-memory block level, at a quarter-memory block level, or at a level with any suitable number of memory blocks or any suitable fraction of a memory block. Memory cells 305 of adjacent memory cell strings 304 may be coupled by word lines 312 that select which row of memory cells 305 is affected by read or programming operations.

In some examples, the peripheral circuit 302 may comprise any suitable analog, digital, and mixed-signal circuit to enable operation of the memory array 301 by applying at least one of voltage signals or current signals to each of target memory cells 305 and sensing at least one of voltage signals or current signals from each of target memory cells 305 through the bit lines 311, the word lines 312, the common source lines 310, the bottom select lines 309, and the top select lines 308. The peripheral circuit 302 may comprise various types of peripheral circuits formed using metal-oxide-semiconductor technology.

Figure 5:
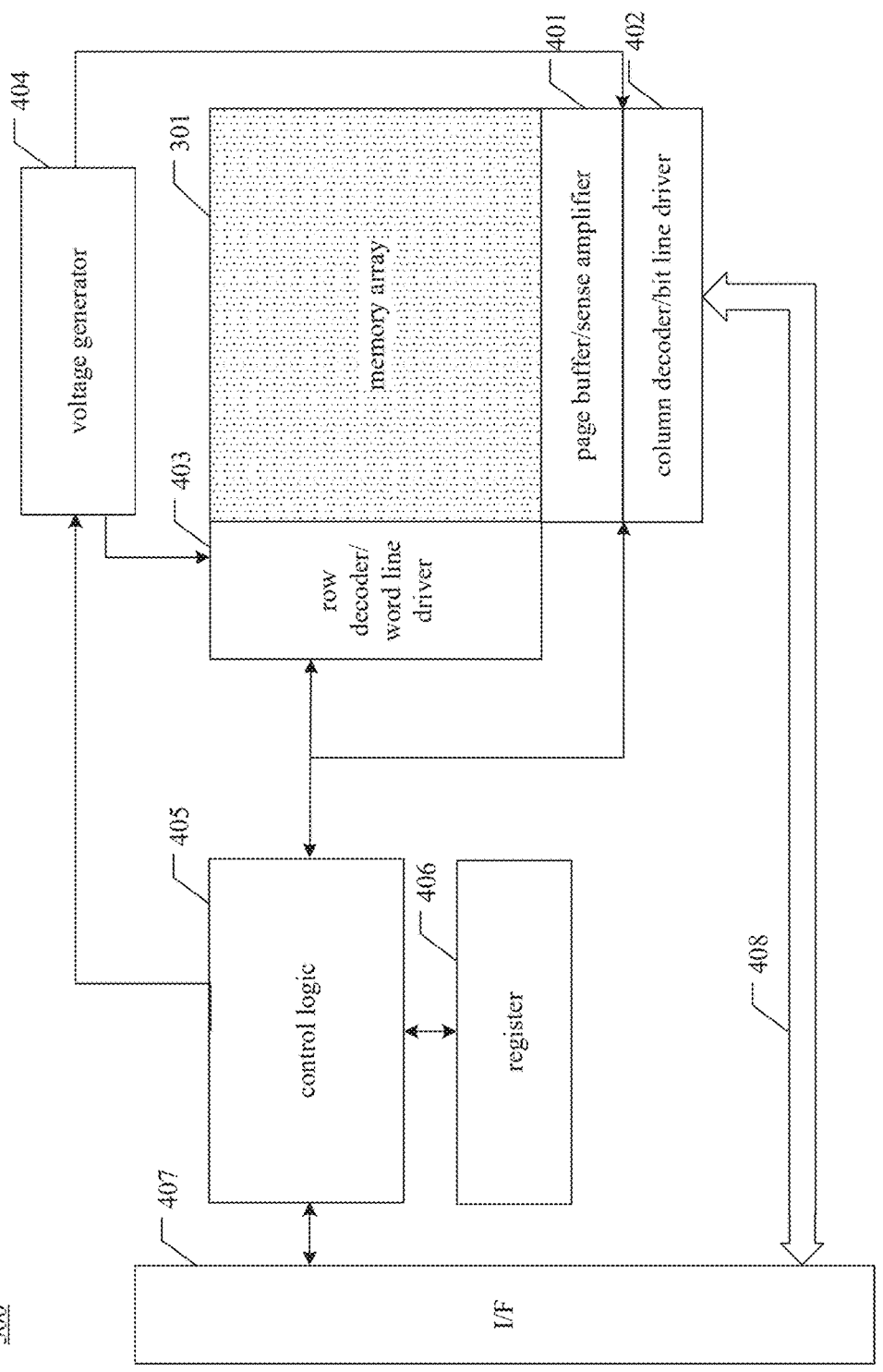
FIG. 5 is a schematic diagram of an example memory comprising a memory array and a peripheral circuit according to an example of the present disclosure.

FIG. 5 shows some example peripheral circuits 302 comprising a page buffer/sensing amplifier 401, a column decoder/bit line driver 402, a row decoder/word line driver 403, a voltage generator 404, control logic 405, a register bank 406, a flash memory interface 407, and a data bus 408. It should be understood that, in some examples, additional peripheral circuits not shown in FIG. 5 may also be comprised.

The page buffer/sensing amplifier 401 may be configured to read data from memory array 301 and program (write) data to the memory array 301 according to control signals from the control logic 405. In one example, the page buffer/sensing amplifier 401 may store a page of programming data (written data) to be programmed to the memory array 301. In another example, the page buffer/sensing amplifier 401 may perform a programming verification operation to ensure that data has been properly programmed into memory cells coupled to the selected word line. In yet another example, the page buffer/sensing amplifier 401 may also sense a low power signal from the bit line representing a data bit stored in the memory cell and amplify a small voltage swing to an identifiable logic level in a read operation. The column decoder/bit line driver 402 may be configured to be controlled by the control logic 405 and select one or more memory cell strings by applying a bit line voltage generated from the voltage generator 404.

The row decoder/word line driver 403 may be configured to be controlled by the control logic 405 and select/deselect a memory block of the memory array 301 and select/deselect a word line of the memory block. The row decoder/word line driver 403 may also be configured to drive a word line using the word line voltage generated from the voltage generator 404. In some aspects, the row decoder/word line driver 403 may also select/deselect and drive the bottom select line and the top select line. As described in detail below, the row decoder/word line driver 403 is configured to perform a programming operation on memory cells coupled to the (one or more) selected word line(s). The voltage generator 404 may be configured to be controlled by the control logic 405 and generate word line voltages (e.g., reading voltages, programming voltages, passing voltages, local voltages, verifying voltages, etc.), bit line voltages, and source line voltages to be supplied to the memory array 301.

The control logic 405 may be coupled to each peripheral circuit described above and configured to control operation of each peripheral circuit. Register bank 406 may be coupled to control logic 405 and comprise status registers, command registers, and address registers for storing status information, command operation codes (OP codes), and command addresses for controlling operation of each peripheral circuit. The flash memory interface 407 may be coupled to the control logic 405 and act as a control buffer to buffer control commands received from a host-side device (not shown) and relay them to the control logic 405 and buffer status information received from the control logic 405 and relay it to a memory controller. The flash memory interface 407 may also be coupled to the column decoder/bit line driver 402 via the data bus 408 and act as a data I/O interface and a data buffer to buffer data and relay it to the memory array 301, or relay or buffer data from the memory array 301.

Figure 6:
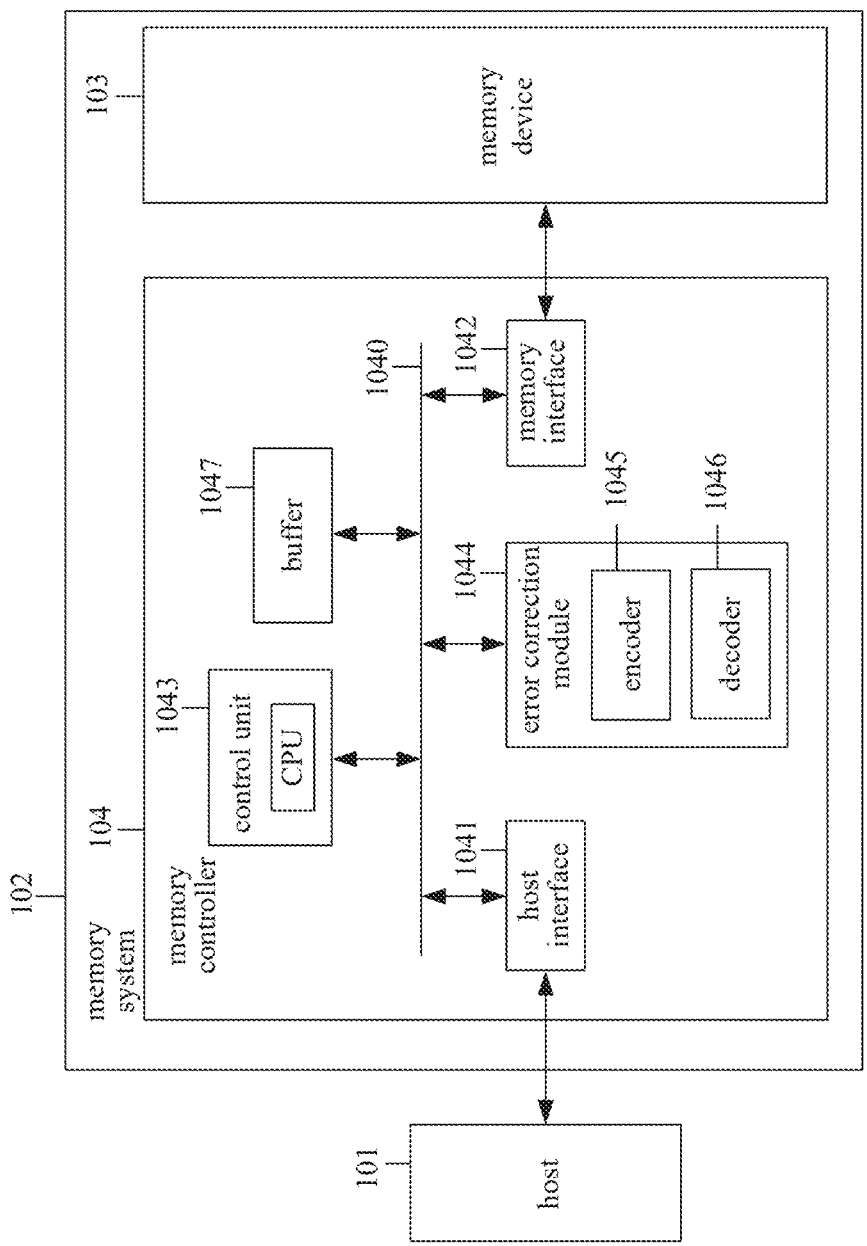
FIG. 6 is a second schematic diagram of an example system having a memory system according to an example of the present disclosure.

FIG. 6 is a schematic diagram of a system comprising a host and a memory system according to an example of the present disclosure. As shown in FIG. 6, the memory system 102 is connected to the host 101, and the memory system 102 may comprise a memory controller 104 and a memory device 103. The memory controller 104 is configured to control the memory device 103 to perform operations such as read, write, and erase operations. The memory controller 104 and the memory device 103 may also be coupled in any suitable way. The memory controller 104 may comprise a host interface (I/F) 1041, a memory interface (I/F) 1042, a control unit 1043, an error correction module 1044, a buffer 1047, and a bus 1040. The host interface 1041 is a connection interface between the connection host 101 and the memory controller 104. The host interface 1041 allows the host 101 and the memory controller 104 to communicate according to a specific protocol, transmit read and write requests, and perform other operations. The memory interface 1042 is a connection interface between the memory controller 104 and the memory device 103, and the memory interface 1042 is configured to implement data transmission between the memory controller 104 and the memory device 103. The control unit 1043 is configured to control the memory system 102 as a whole.

In some examples, the control unit 1043 may comprise one or more units having a logical operation capability, for example, at least one of a central processing unit (CPU) or a micro controller unit (MCU), or the like.

In some examples, the buffer 1047 is configured to buffer data, and may be a volatile memory device with a relatively fast read-write speed, such as at least one of a static random-access memory (SRAM) or a dynamic random access memory (DRAM).

In some examples, the error correction module 1044 may be configured to encode and decode data in the memory system using error correction code techniques. In some examples, the error correction module 1044 may comprise an encoder 1045 and a decoder 1046, where the encoder 1045 may be configured to encode the data to be written into the memory device in a write operation. The decoder 1046 may be configured to decode the codeword to be decoded in the read data in a read operation. In some examples, the decoder 1046 may decode the codeword to be decoded in a way of LDPC layered decoding.

Figure 8:
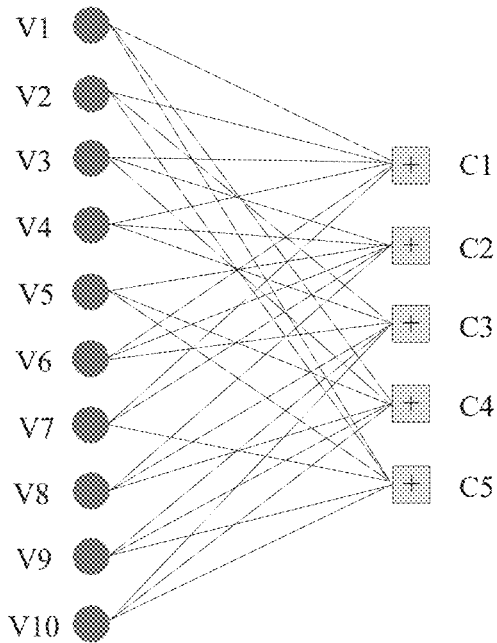
FIG. 8 is a bipartite graph corresponding to the LDPC code check matrix shown in FIG. 7.

FIG. 7 shows an example LDPC code check matrix, and FIG. 8 is a bipartite graph corresponding to the LDPC code check matrix shown in FIG. 7. As shown in FIG. 7 and FIG.

8, one vertex set represents a symbol variable, referred to as a variable node (VN), and the other vertex set represents a local constraint, referred to as a constraint node or a check node (CN). When and only when the element $h_{ij}$ in the check matrix is 1, there is one edge connected to the $i^{th}$ check node ($CN_i$) and the $j^{th}$ variable node ($CN_j$). There are m check nodes and n variable nodes in the bipartite graph, which respectively correspond to m rows and n columns of the check matrix. For an (n, $d_v$, $d_e$) regular LDPC code, there are $m*d_e=n*d_v$ edges on the bipartite graph, there are $d_v$ edges connected to each variable node, and there are $d_e$ edges connected to each check node. In the bipartite graph shown in FIG. 8, there are 5 check nodes and 10 variable nodes, which respectively correspond to 5 rows and 10 columns of the check matrix as shown in FIG. 7, there are 5*6=10*3 edges on the bipartite graph, and there are 3 edges connected to each variable node, and there are 6 edges connected to each check node.

The basic idea of layered decoding is to divide an LDPC code into a plurality of sub-codes for iterative decoding, and rows (check nodes) of the check matrix may be divided into several groups, each group can be considered as a layer (one sub-code), and each layer comprises a plurality of sub-matrixes. A serial iteration strategy is adopted between each group, and an ordinary full-parallel iteration strategy is adopted in the group; intra-group iterative decoding can adopt a sum-product algorithm (SPA), a min-sum algorithm (MSA) and a modified MSA. For quasi-cyclic low-density parity-check codes (QC-LDPC), Z rows may be considered as a layer, and Z is a size of a sub-matrix.

In layered decoding, once all check nodes of each sub-code are updated, the variable nodes are updated. That is, once a portion of check nodes are updated, the variable nodes are updated. Therefore, in one iteration, the update of the check nodes in the following layer uses the variable node message that has been updated in the previous layer in this iteration, rather than using the node information of the previous iteration process as in the original SPA, which accelerates the convergence speed of the decoding. One iteration refers to completing an update of all check nodes. The layered decoding algorithm performs message calculation updating and message transmission in the ascending order of the check nodes, this ensures that the updated confidence message can be immediately delivered, thereby accelerating the convergence speed and reducing the number of iterations.

The specific process of layered decoding will be further described below.

Figure 9:
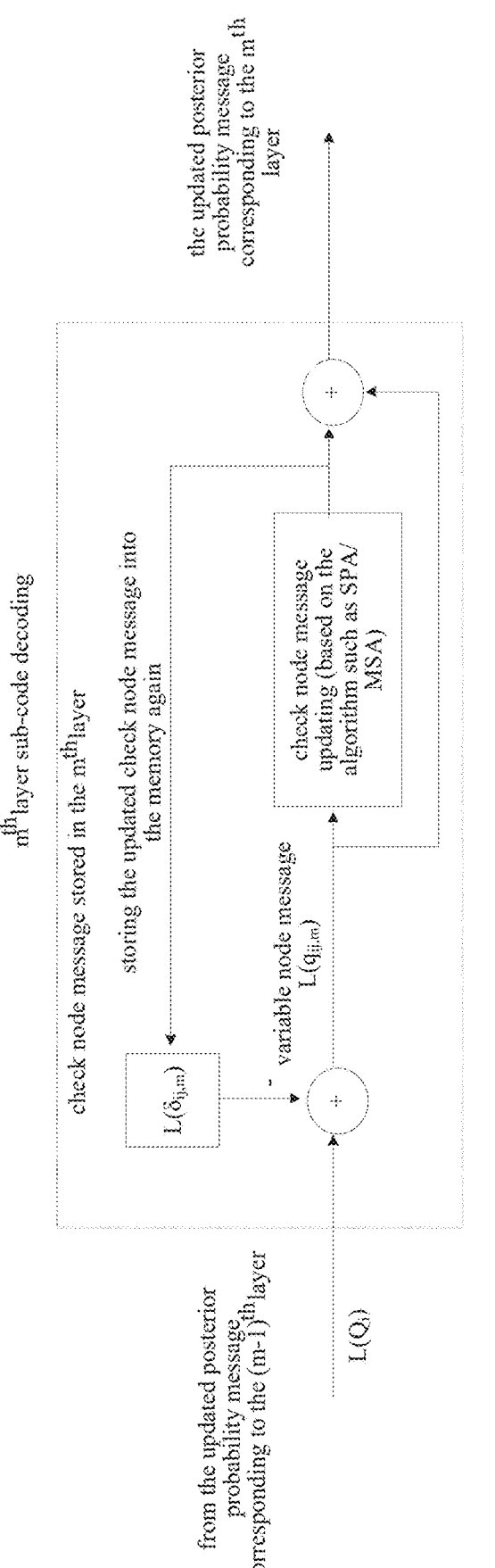
FIG. 9 is a block diagram of operations of a layered decoding algorithm of an LDPC code according to an example of the present disclosure.

FIG. 9 is a block diagram of operations of a layered decoding algorithm of an LDPC code. As shown in FIG. 9, the process of a $m^{th}$ layer sub-code decoding comprises, in a current iteration, obtaining a variable node message ($L(q_{ij,m})$) corresponding to each non-zero sub-matrix of the $m^{th}$ layer by adding a posterior probability message ($L(Q_i)$) corresponding to each non-zero sub-matrix of the $m^{th}$ layer and a negative check node message ($L(\delta_{ij,m})$) corresponding to each non-zero sub-matrix of the ml layer in the previous iteration, the posterior probability messages corresponding to each non-zero sub-matrix in the $m^{th}$ layer herein can be understood as the updated posterior probability messages of the $(m-1)^{th}$ layer during the decoding process in the current iteration. The process of a $m^{th}$ layer sub-code decoding includes obtaining a check node message corresponding to each non-zero sub-matrix of the $m^{th}$ layer based on the variable node message ($L(q_{ij,m})$) corresponding to each non-zero sub-matrix of the $m^{th}$ layer, and an algorithm such as a sum-product algorithm, a min-sum algorithm, etc. The process of a $m^{th}$ layer sub-code decoding includes adding the variable node message corresponding to each non-zero sub-matrix of the $m^{th}$ layer and the check node corresponding to each non-zero sub-matrix of the $m^{th}$ layer to obtain an updated posterior probability message corresponding to each non-zero sub-matrix of the mt layer, where only the posterior probability message corresponding to the non-zero sub-matrix of the $m^{th}$ layer is updated in the decoding of the $m^{th}$ layer. The posterior probability message herein is also referred to as log-likelihood ratio (LLR).

It can be known from the above decoding process that the updated posterior probability message of the layered decoding in the iteration uses the latest check node messages, and this is the reason why the layered decoding algorithm is faster in convergence speed than the min-sum algorithm. However, the message update of the layered algorithm is sequentially updated serially down according to the row order, and increasing the degree of parallelism of serial decoding to achieve high throughput presents various challenges.

Figure 10:
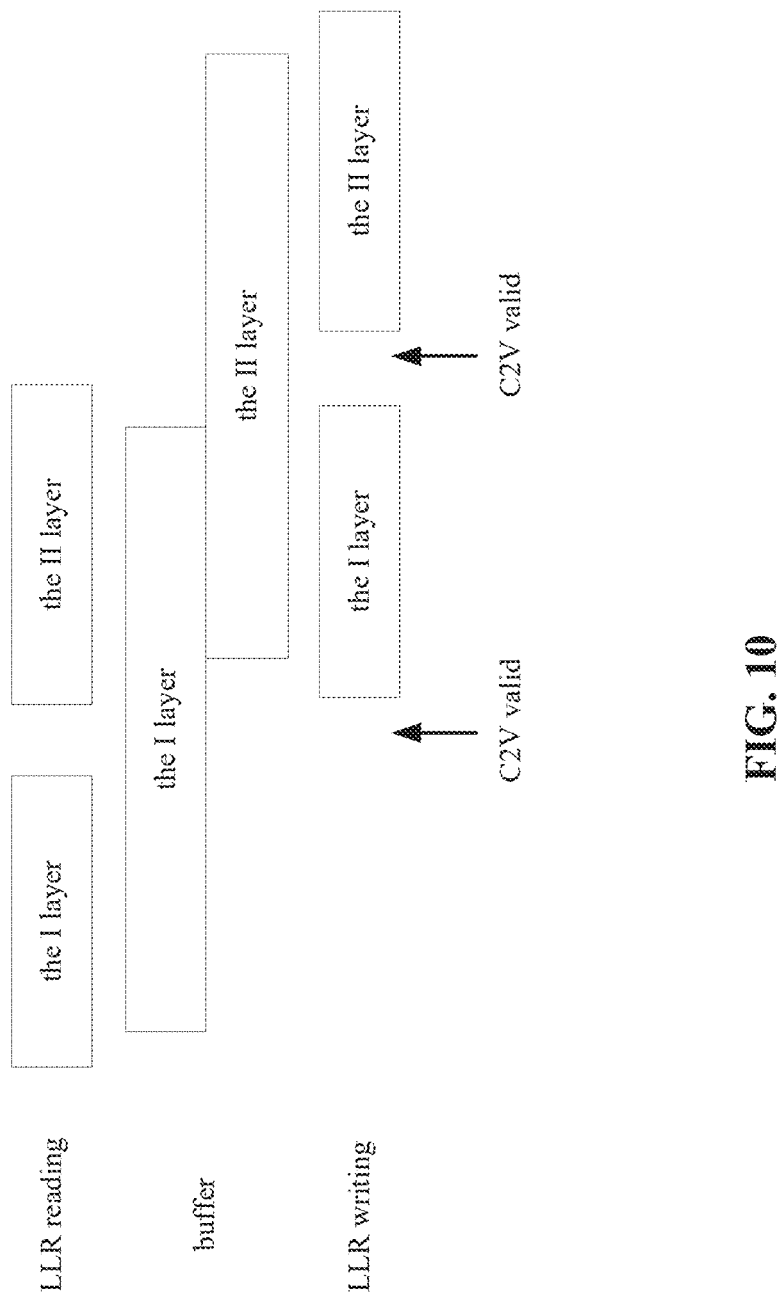
FIG. 10 is a schematic diagram of reading and writing of a posterior probability message according to an example of the present disclosure.

During serial decoding, because the decoding of the next layer needs to use the posterior probability information output by the decoding of the previous layer, it is needed to wait for the decoding of the previous layer to output the posterior probability information to perform the decoding of the next layer, and the waiting time is "idle time". In some examples, as shown in FIG. 10, when the II layer is coded, it is needed to read the posterior probability message corresponding to all non-zero sub-matrices of the II layer to update the check node message (the posterior probability message corresponding to each non-zero sub-matrix of the II layer is the updated posterior probability message in the decoding of the I layer. That is, the updated posterior probability message of the I layer to which the LLR shown in FIG. 10 is written), and after the check node message (C2V) is valid, the posterior probability message can be updated, and the updated posterior probability message of each non-zero sub-matrix of the II layer is written back. The posterior probability message of a certain column of the II layer is not readable until the posterior probability message of this column of the I layer is written back. The buffer in FIG. 10 may be understood as a third memory configured to store a variable node message in the following description.

Figure 11:
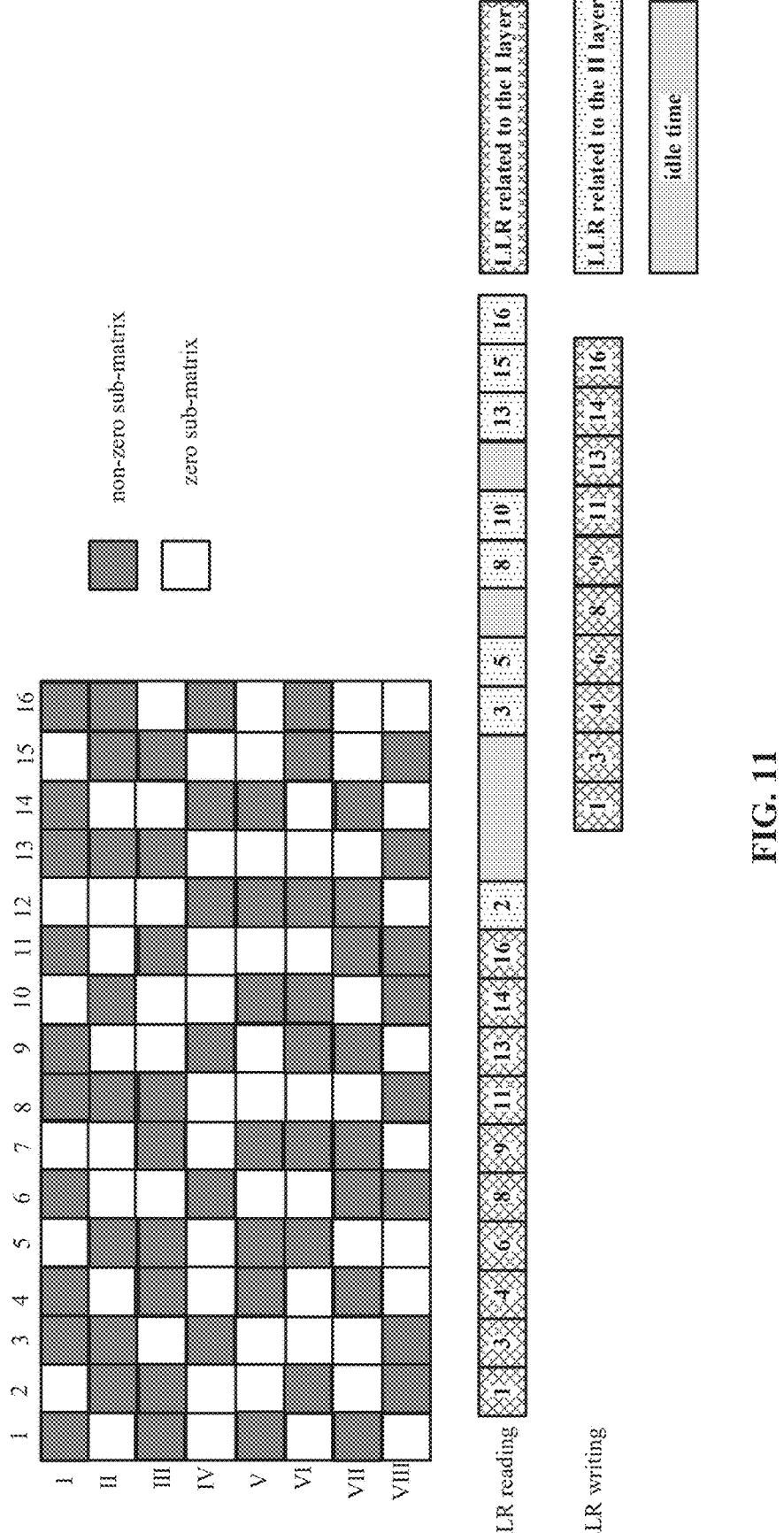
FIG. 11 is a first schematic diagram of an order of reading and writing of a posterior probability message corresponding to each non-zero sub-matrix in a check matrix according to an example of the present disclosure.

FIG. 11 shows a first schematic diagram of an order of reading and writing of a posterior probability message corresponding to each non-zero sub-matrix in a check matrix. As shown in FIG. 11, the check matrix comprises 16 columns from 1 to 16, and 8 layers from I to VIII, and in an LLR reading of the LLR related to the I layer, a posterior probability message corresponding to each non-zero sub-matrix of the I layer is read, and the posterior probability message corresponding to each non-zero sub-matrix of the I layer is an updated posterior probability message of the VIII layer in the previous iteration; in the LLR writing of the LLR related to the I layer, an updated posterior probability message of each non-zero sub-matrix of the I layer in the current iteration is written; in the LLR reading of the LLR related to the II layer, for the reading of the posterior probability of the non-zero sub-matrix of the same column as the I layer, an updated posterior probability message of the non-zero sub-matrix of a corresponding column of the I layer is actually read, thus only after the updated posterior probability message of the non-zero sub-matrix of the corresponding column of the I layer is written, the posterior probability message corresponding to the non-zero sub-matrix of this column of the II layer can be read.

It can be understood with reference to FIG. 11 that the second column of the I layer is a zero sub-matrix, thus the posterior probability message corresponding to the zero sub-matrix of the second column does not need to be updated in the decoding of the I layer, and after the LLR reading of the LLR related to the I layer, the posterior probability message of the non-zero sub-matrix of the second column of the II layer can be read immediately, and the reading of the posterior probability message of the non-zero sub-matrix of the third column of the II layer needs to wait until the updated posterior probability message of the non-zero sub-matrix of the third column of the I layer is written. Thus, there is a certain idle time between the reading of the posterior probability message corresponding to the non-zero sub-matrix of the second column of the II layer and the reading of the posterior probability message corresponding to the non-zero sub-matrix of the third column of the II layer.

In the above example, sequential reading and sequential writing of posterior probability messages can easily cause inter-layer read-write conflicts; thus, it is required to wait for write back before reading, resulting in idle time. How to reduce idle time and improve decoding efficiency has become an urgent problem to be solved at present.

In this regard, the present disclosure proposes the following aspects.

Figure 12:
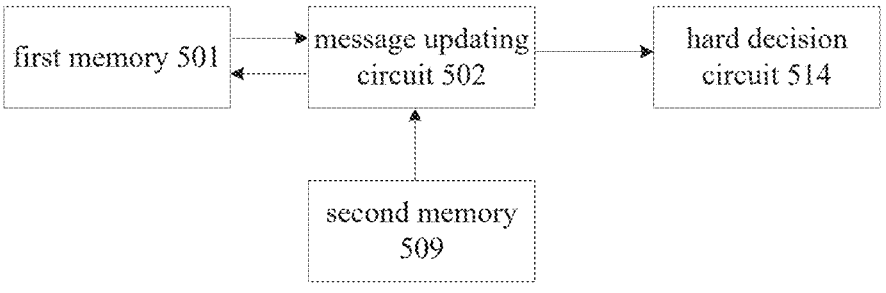
FIG. 12 is a first schematic diagram of a structure of a decoder according to an example of the present disclosure.

The present disclosure provides a decoder configured to perform layered iterative decoding based on a check matrix corresponding to a codeword to be decoded. As shown in FIG. 12, the decoder comprises a first memory 501 and a message updating circuit 502; the first memory 501 is configured to store a posterior probability message; the message updating circuit 502 is configured to: sequentially read a posterior probability message corresponding to each non-zero sub-matrix of a current layer from the first memory 501 in a first reading order determined according to a position of each non-zero sub-matrix of the current layer; obtain an updated posterior probability message corresponding to each non-zero sub-matrix of the current layer based on the posterior probability message corresponding to each non-zero sub-matrix of the current layer in a current iteration; sequentially write the updated posterior probability message corresponding to each non-zero sub-matrix of the current layer into the first memory 501 in a first writing order. The first writing order is determined according to the first reading order.

In the example of the present disclosure, when layered iterative decoding is performed, a posterior probability message corresponding to each non-zero sub-matrix of a current layer is sequentially read from the first memory 501 in a first reading order, an updated posterior probability message corresponding to each non-zero sub-matrix of the current layer is sequentially written into the first memory 501 in a first writing order, and the first writing order is determined according to the first reading order. In the example of the present disclosure, by optimizing the reading and writing order of the intra-layer posterior probability message, the read-write conflict of the inter-layer posterior probability message can be avoided, such that the idle time can be effectively reduced, and the decoding efficiency is improved.

In the example of the present disclosure, the first memory 501 is a volatile memory, comprising but not limited to a random access memory (RAM), a dynamic random access memory (DRAM), a static random access memory (SRAM), a synchronous dynamic random access memory (SDRAM), and a double data rate (DDR) SDRAM (DDR SDRAM).

In some examples, the first reading order is determined according to a position relationship between each non-zero sub-matrix of the current layer and non-zero sub-matrices of a previous layer of the current layer and a layer before the previous layer of the current layer.

Figure 13A:
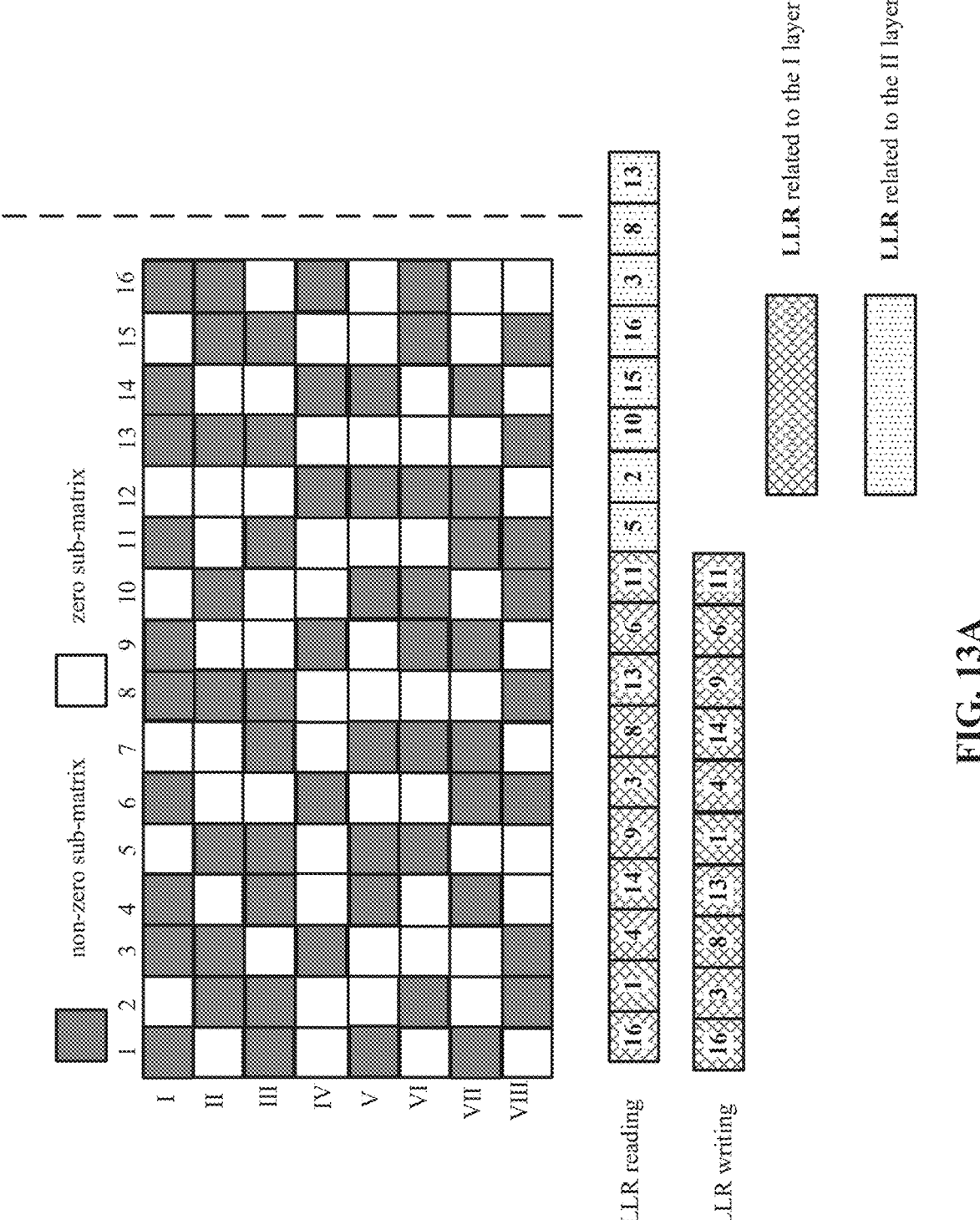
FIGS. 13A and 13B are a second schematic diagram of order of reading and writing of a posterior probability message corresponding to each non-zero sub-matrix in a check matrix according to an example of the present disclosure.
Figure 13B:
Figure 13B:
Figure 13B:
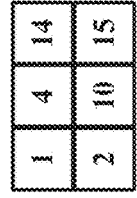
Figure 13B:
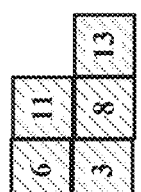

FIGS. 13A and 13B show a second schematic diagram of order of reading and writing of a posterior probability message corresponding to each non-zero sub-matrix in a check matrix. Referring to the check matrix shown in FIGS. 13A and 13B, the check matrix comprises eight layers from I to VIII, the check matrix comprises 16 columns from 1 to 16, and each layer comprises a zero sub-matrix and a non-zero sub-matrix. A previous layer of the I layer is a VIII layer, and a layer before the previous layer of the I layer is a VII layer; a previous layer of the II layer is a I layer, and a layer before the previous layer of the II layer is a VIII layer; a previous layer of the III layer is a II layer, and a layer before the previous layer of the III layer is a I layer; other layers are similar, and details are not described herein again.

In some examples, according to the position relationship between the non-zero sub-matrix of each layer and the non-zero sub-matrices of the previous layer and a layer before the previous layer of each layer, the non-zero sub-matrix of each layer is divided into the first category, the second category, and the third category; in the column where the non-zero sub-matrix in the first category of the current layer is located, both the previous layer of the current layer and a layer before the previous layer of the current layer are zero sub-matrices; in the column where the non-zero sub-matrix in the second category of the current layer is located, the previous layer of the current layer is the zero sub-matrix, and a layer before the previous layer of the current layer is the non-zero sub-matrix; and in the column where the non-zero sub-matrix in the third category of the current layer is located, the previous layer of the current layer is the non-zero sub-matrix.

As shown in operation 1 in FIG. 13B, the non-zero sub-matrix of the I layer is divided into three categories, where the first category comprises a non-zero sub-matrix of the I layer in the sixteenth column, and the VII layer and the VIII layer in the sixteenth column are each zero sub-matrices. The second category comprises a non-zero sub-matrices of the I layers in the first, fourth, ninth, and fourteenth columns, the VIII layers in the first, fourth, ninth, and fourteenth columns are each zero sub-matrices, and the VII layers in the first, fourth, ninth, and fourteenth columns are each non-zero sub-matrices. The third category comprises a non-zero sub-matrices of the I layers in the third, sixth, eighth, eleventh, and thirteenth columns, and the VIII layers in the third, sixth, eighth, eleventh, and thirteenth columns are each non-zero sub-matrices.

The non-zero sub-matrices of the II layers is divided into three categories, where the first category comprises a non-zero sub-matrix of the II layer in the fifth column, and the I layer and the VIII layer in the fifth column are each zero sub-matrices; the second category comprises a non-zero sub-matrices of the II layers in the second, tenth, and fifteenth columns, the I layers in the second, tenth, and fifteenth columns are each zero sub-matrices, and the VIII layers in the second, tenth, and fifteenth columns are each non-zero sub-matrices; the third category comprises a non-zero sub-matrices of the II layers in the third, eighth, thirteenth, and sixteenth columns, and the I layers in the third, eighth, thirteenth, and sixteenth columns are each non-zero sub-matrices. Other layers are similar, and details are not described herein again.

In some examples, the message updating circuit 502 is configured to sequentially read, from the first memory 501 in the first reading order, a posterior probability message corresponding to the non-zero sub-matrix belonging to the first category in the non-zero sub-matrices of the current layer, a posterior probability message corresponding to the non-zero sub-matrix belonging to the second category in the non-zero sub-matrices of the current layer, and a posterior probability message corresponding to the non-zero sub-matrix belonging to the third category in the non-zero sub-matrices of the current layer.

The sequentially reading, from the first memory 501 in the first reading order, a posterior probability message corresponding to the non-zero sub-matrix belonging to the first category in the non-zero sub-matrices of the current layer, a posterior probability message corresponding to the non-zero sub-matrix belonging to the second category in the non-zero sub-matrices of the current layer, and a posterior probability message corresponding to the non-zero sub-matrix belonging to the third category in the non-zero sub-matrices of the current layer can be understood as follows.

For example, in the first reading order, the posterior probability message corresponding to the non-zero sub-matrix of the first category is read first, the posterior probability message corresponding to the non-zero sub-matrix of the second category is read in the middle, and the posterior probability message corresponding to the non-zero sub-matrix of the third category is read last.

Referring to FIGS. 13A and 13B, in the reading of the posterior probability message of the I layer, the posterior probability message corresponding to the non-zero sub-matrix of the first category of the I layer (the non-zero sub-matrix of the I layer in the sixteenth column) is read first. Then, the posterior probability message corresponding to the non-zero sub-matrix of the second category of the I layer (the non-zero sub-matrices of the I layers in the first, fourth, ninth, and fourteenth columns) is read next. Finally, the posterior probability message corresponding to the non-zero sub-matrix of the third category of the I layer (the non-zero sub-matrices of the I layer in the third, sixth, eighth, eleventh, and thirteenth columns) is read.

In the reading of the posterior probability message of the II layer, the posterior probability message corresponding to the non-zero sub-matrix of the first category of the II layer (the non-zero sub-matrix of the II layer in the fifth column) is read first. Then, the posterior probability message corresponding to the non-zero sub-matrix of the second category of the II layer (the non-zero sub-matrices of the II layers in the second, tenth, and fifteenth columns) is read. Finally, the posterior probability message corresponding to the non-zero sub-matrix of the third category of the II layer (the non-zero sub-matrices of the II layer in the third, eighth, thirteenth, and sixteenth columns) is read.

In some examples, when the posterior probability message corresponding to the non-zero sub-matrix belonging to the second category in the non-zero sub-matrices of the current layer is read, the message updating circuit 502 is configured to sequentially read, from the first memory 501, the posterior probability message corresponding to the first portion of the non-zero sub-matrix, the posterior probability message corresponding to the second portion of the non-zero sub-matrix, and the posterior probability message corresponding to the third portion of the non-zero sub-matrix; in the column where the first portion of the non-zero sub-matrix is located. The non-zero sub-matrix of the layer before the previous layer of the current layer belongs to the first category. In the column where the second portion of the non-zero sub-matrix is located, the non-zero sub-matrix of the layer before the previous layer of the current layer belongs to the second category. In the column where the third portion of the non-zero sub-matrix is located, the non-zero sub-matrix of the layer before the previous layer of the current layer belongs to the third category.

Here, sequentially reading, from the first memory 501, the posterior probability message corresponding to the first portion of the non-zero sub-matrix, the posterior probability message corresponding to the second portion of the non-zero sub-matrix, and the posterior probability message corresponding to the third portion of the non-zero sub-matrix may be understood according to the following.

When the posterior probability message corresponding to the non-zero sub-matrix belonging to the second category in the non-zero sub-matrices of the current layer is read, the posterior probability message corresponding to the first portion of the non-zero sub-matrix is read first. Then, the posterior probability message corresponding to the second portion of the non-zero sub-matrix is read. Finally, the posterior probability message corresponding to the third portion of the non-zero sub-matrix is read.

Figure 14A:
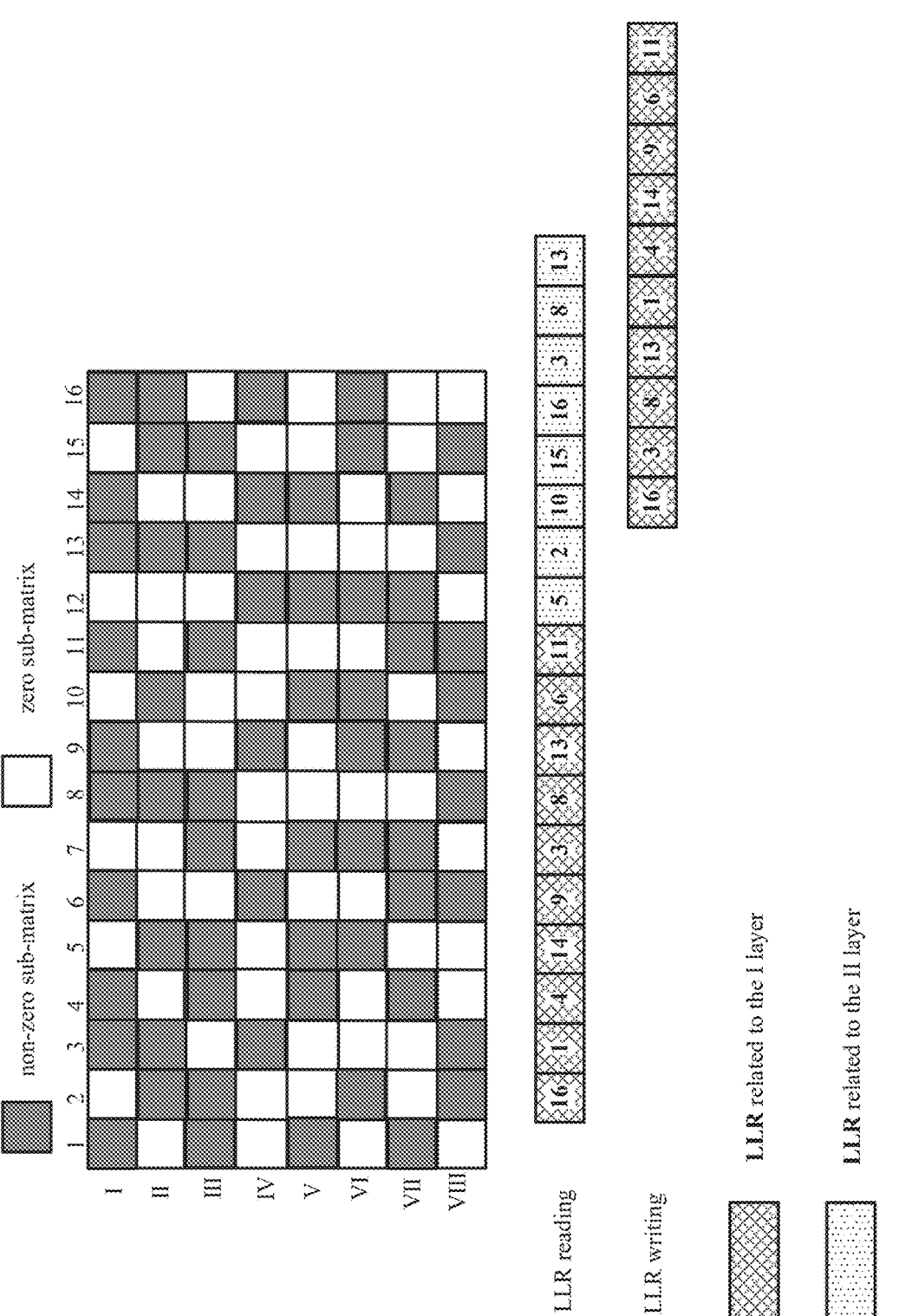
FIGS. 14A-14C are a third schematic diagram of order of reading and writing of a posterior probability message corresponding to each non-zero sub-matrix in a check matrix according to an example of the present disclosure.
Figure 14B:
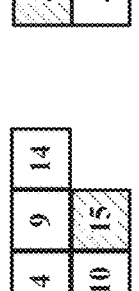
Figure 14B:
Figure 14B:
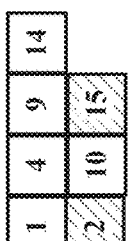
Figure 14B:
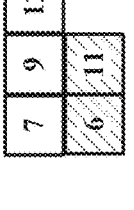
Figure 14B:
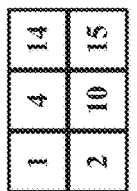
Figure 14B:
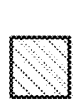
Figure 14C:
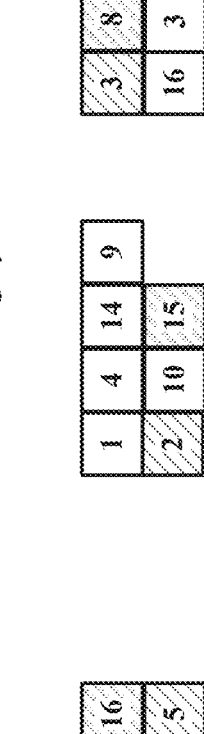

FIGS. 14A-14C show a third schematic diagram of order of reading and writing of a posterior probability message corresponding to each non-zero sub-matrix in a check matrix. Operation 2 in FIG. 14C further adjusts the reading order of the posterior probability messages corresponding to the non-zero sub-matrix of the second category and the third category.

Referring to FIGS. 14A-14C, in a case where the current layer is the I layer, the I layer does not comprise the first portion of the non-zero sub-matrix; the second portion of the non-zero sub-matrix in the I layer is the non-zero sub-matrix of the I layer in the first, fourth, and fourteenth columns, and the non-zero sub-matrix of the VII layer in the first, fourth, and fourteenth columns belongs to the second category; the third portion of the non-zero sub-matrix in the I layer is the non-zero sub-matrix of the I layer in the ninth column, and the non-zero sub-matrix of the VII layer in the ninth column belongs to the third category. When the posterior probability message corresponding to the non-zero sub-matrix belonging to the second category in the non-zero sub-matrices of the I layer is read, the posterior probability message corresponding to the non-zero sub-matrix of the I layer in the first, fourth, and fourteenth columns is read first, and then the posterior probability message corresponding to the non-zero sub-matrix of the I layer in the ninth column is read.

With continued reference to FIGS. 14A-14C, in a case where the current layer is the II layer, the II layer does not comprise the first portion of the non-zero sub-matrix. The second portion of the non-zero sub-matrix in the II layer is the non-zero sub-matrix of the II layer in the second, tenth, and fifteenth columns, the non-zero sub-matrix of the VIII layer in the second, tenth, and fifteenth columns belongs to the second category. The II layer does not comprise the third portion of the non-zero sub-matrix. When the posterior probability message corresponding to the non-zero sub-matrix belonging to the second category in the non-zero sub-matrices of the II layer is read, the posterior probability messages corresponding to the non-zero sub-matrices of the II layer in the second, tenth, and fifteenth columns are sequentially read.

In some examples, when the posterior probability message corresponding to the non-zero sub-matrix belonging to the third category in the non-zero sub-matrices of the current layer is read, the message updating circuit 502 is configured to sequentially read, from the first memory 501, the posterior probability message corresponding to the fourth portion of non-zero sub-matrix, the posterior probability message corresponding to the fifth portion of non-zero sub-matrix, and the posterior probability message corresponding to the sixth portion of non-zero sub-matrix. In the column where the fourth portion of non-zero sub-matrix is located, the non-zero sub-matrix of the previous layer of the current layer belongs to the first category. In the column where the fifth portion of non-zero sub-matrix is located, the non-zero sub-matrix of the previous layer of the current layer belongs to the second category. In the column where the sixth portion of non-zero sub-matrix is located, the non-zero sub-matrix of the previous layer of the current layer belongs to the third category.

Here, sequentially reading, from the first memory 501, the posterior probability message corresponding to the fourth portion of non-zero sub-matrix, the posterior probability message corresponding to the fifth portion of non-zero sub-matrix, and the posterior probability message corresponding to the sixth portion of non-zero sub-matrix may be understood according to the following.

When the posterior probability message corresponding to the non-zero sub-matrix belonging to the third category in the non-zero sub-matrices of the current layer is read, the posterior probability message corresponding to the fourth portion of the non-zero sub-matrix is read first. Then, the posterior probability message corresponding to the fifth portion of the non-zero sub-matrix is read. Finally, the posterior probability message corresponding to the sixth portion of the non-zero sub-matrix is read.

Referring to FIGS. 14A-14C, in a case where the current layer is the I layer, the fourth portion of the non-zero sub-matrix in the I layer is the non-zero sub-matrix of the I layer in the third, eighth, and thirteenth columns, and the non-zero sub-matrix of the VIII layer in the third, eighth, and thirteenth columns belong to the first category. The I layer does not comprise the fifth portion of the non-zero sub-matrix. The sixth portion of the non-zero sub-matrix in the I layer is the non-zero sub-matrix of the I layer in the sixth, and eleventh columns, the non-zero sub-matrix of the VIII layer in the sixth, and eleventh columns belongs to the third category. When the posterior probability message corresponding to the non-zero sub-matrix belonging to the third category in the non-zero sub-matrices of the I layer is read, the posterior probability message corresponding to the non-zero sub-matrix of the I layer in the third, eighth, and thirteenth columns is read first, and then the posterior probability message corresponding to the non-zero sub-matrix of the I layer in the sixth, and eleventh columns is read.

With continued reference to FIGS. 14A-14C, in a case where the current layer is the II layer, the fourth portion of the non-zero sub-matrix in the II layer is the non-zero sub-matrix of the II layer in the sixteenth column, and the non-zero sub-matrix of the I layer in the sixteenth column belong to the first category. The II layer does not comprise the fifth portion of the non-zero sub-matrix; the sixth portion of the non-zero sub-matrix in the II layer is the non-zero sub-matrix of the II layer in the third, eighth, and thirteenth columns, the non-zero sub-matrix of the I layer in the third, eighth, and thirteenth columns belongs to the third category. When the posterior probability message corresponding to the non-zero sub-matrix belonging to the third category in the non-zero sub-matrices of the II layer is read, the posterior probability message corresponding to the non-zero sub-matrix of the II layer in the sixteenth column is read first, and then the posterior probability message corresponding to the non-zero sub-matrix of the II layer in the third, eighth, and thirteenth columns is read.

In some examples, the first writing order is determined according to a first reading order and a position relationship between each non-zero sub-matrix of the current layer and a non-zero sub-matrix of a next layer of the current layer.

Referring to the check matrix shown in FIGS. 14A-14C, the next layer of the VIII layer is the I layer, the next layer of the I layer is the II layer, and other layers are similar and details are not described herein again.

In some examples, the message updating circuit 502 is configured to sequentially write, into the first memory 501, the posterior probability message corresponding to the non-zero sub-matrix of the current layer for which the column where the non-zero sub-matrix of the current layer is located is a non-zero sub-matrix in the next layer of the current layer, and the posterior probability message corresponding to the non-zero sub-matrix of the current layer for which the column where the non-zero sub-matrix of the current layer is located is a zero sub-matrix in the next layer of the current layer.

Here, sequentially writing, into the first memory 501, the posterior probability message corresponding to the non-zero sub-matrix of the current layer for which the column where the non-zero sub-matrix of the current layer is located is a non-zero sub-matrix in the next layer of the current layer, and the posterior probability message corresponding to the non-zero sub-matrix of the current layer for which the column where the non-zero sub-matrix of the current layer is located is a zero sub-matrix in the next layer of the current layer may be understood as: the posterior probability message corresponding to the non-zero sub-matrix of the current layer for which the column where the non-zero sub-matrix of the current layer is located is a non-zero sub-matrix in the next layer of the current layer is written first, and then the posterior probability message corresponding to the non-zero sub-matrix of the current layer for which the column where the non-zero sub-matrix of the current layer is located is a zero sub-matrix in the next layer of the current layer is written.

Referring to FIGS. 14A-14C, in a case where the current layer is the I layer, the sixteenth, third, eighth, and thirteenth columns of the II layer are each non-zero sub-matrices, the first, fourth, fourteenth, ninth, sixth, and eleventh columns of the II layer are all zero sub-matrices, and further adjustment is performed based on the first reading order For instance, the posterior probability message corresponding to the non-zero sub-matrix of the I layer in the sixteenth, third, eighth, and thirteenth columns is written first. Then, the posterior probability message corresponding to the non-zero sub-matrix of the I layer in the first, fourth, fourteenth, ninth, sixth, and eleventh columns is written. The writing order and the reading order of the posterior probability message corresponding to each non-zero sub-matrix of the I layer in the sixteenth, third, eighth, and thirteenth columns are consistent; and the writing order and the reading order of the posterior probability message corresponding to each non-zero sub-matrix of the I layer in the first, fourth, fourteenth, ninth, sixth, and eleventh columns are consistent.

As shown in FIGS. 14A-14C, by optimizing the reading order and the writing order of the intra-layer posterior probability message, there is no idle time when the posterior probability message corresponding to each non-zero sub-matrix of the II layer is read, so that the decoding efficiency is greatly improved.

In some examples, the message updating circuit 502 is configured to obtain the updated posterior probability message corresponding to each non-zero sub-matrix of the current layer based on the posterior probability message corresponding to each non-zero sub-matrix of the current layer in the current iteration and the check node message corresponding to each non-zero sub-matrix of the current layer in the previous iteration.

Figure 15:
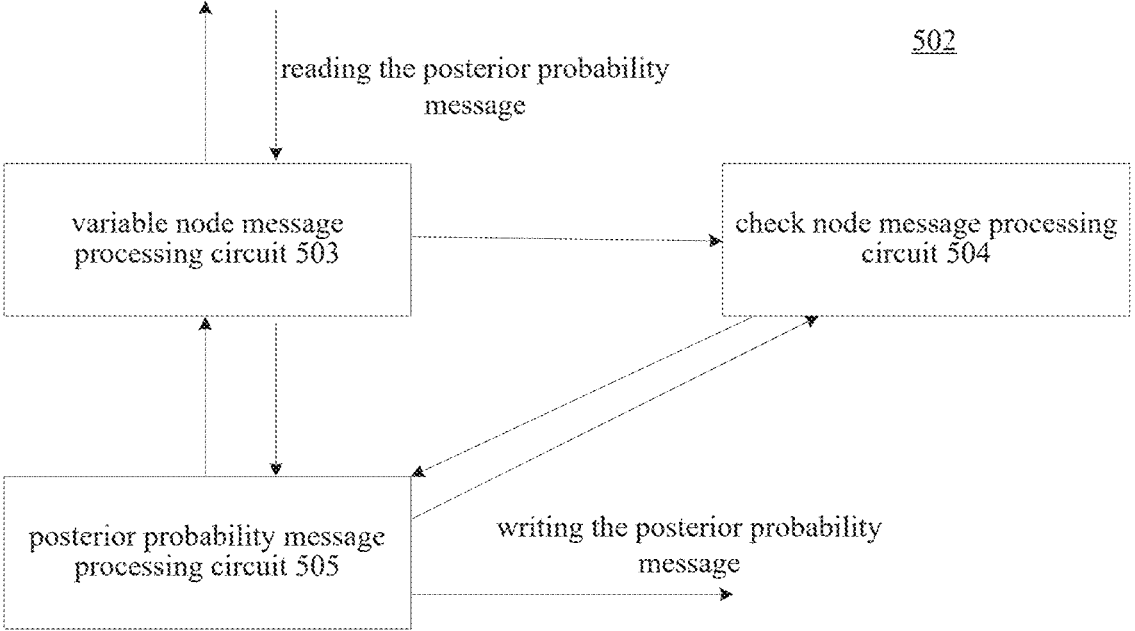
FIG. 15 is a schematic diagram of a structure of a message updating circuit according to an example of the present disclosure.
Figure 16:
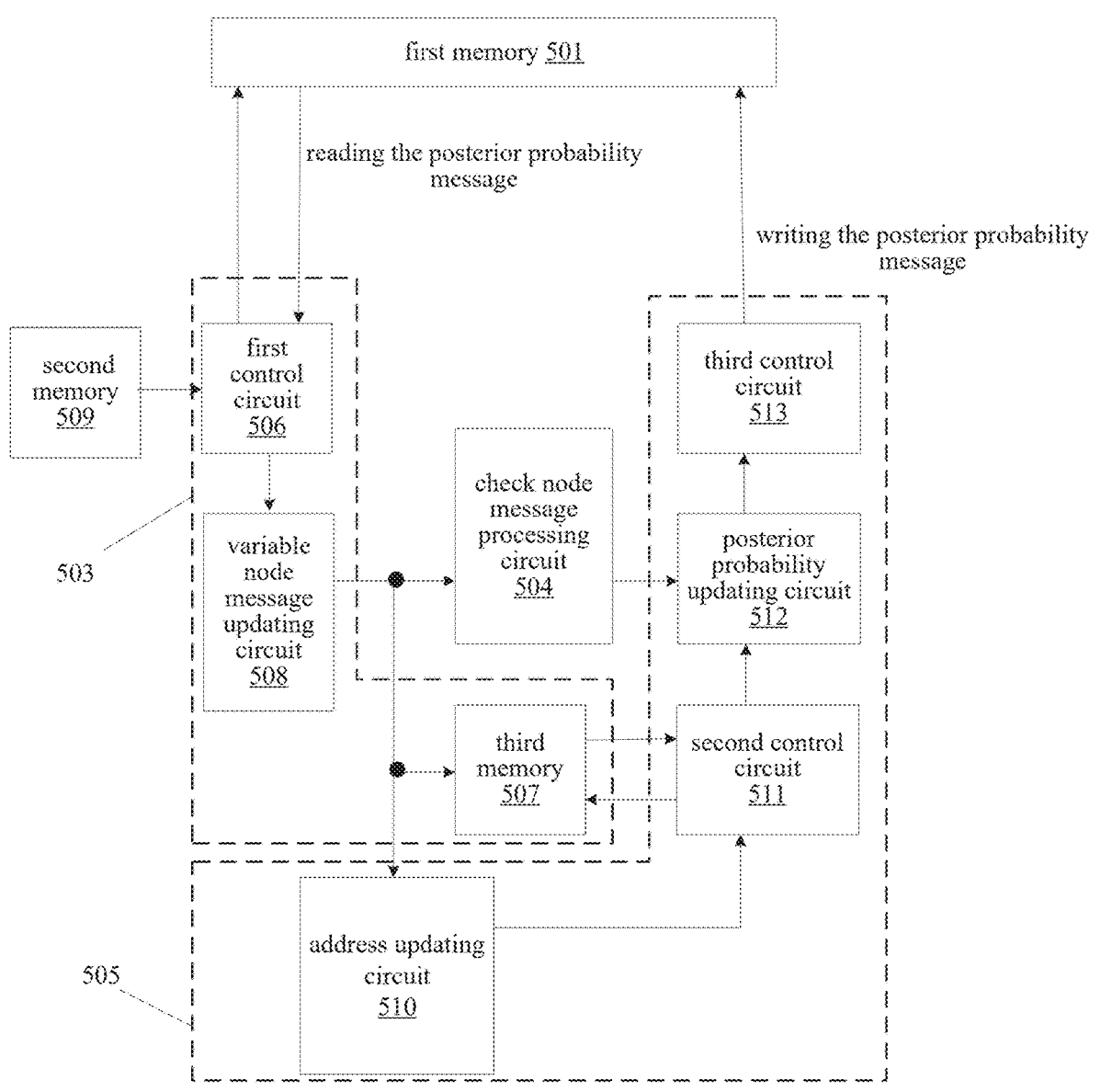
FIG. 16 is a second schematic diagram of a structure of a decoder according to an example of the present disclosure.

In some examples, as shown in FIG. 15 and FIG. 16, the message updating circuit 502 includes, e.g., a variable node message processing circuit 503, a check node message processing circuit 504, and a posterior probability message processing circuit 505.

The variable node message processing circuit 503 is configured to: sequentially read a posterior probability message corresponding to each non-zero sub-matrix of the current layer from the first memory 501 in the first reading order; and obtain a variable node message corresponding to each non-zero sub-matrix of the current layer based on the posterior probability message corresponding to each non-zero sub-matrix of the current layer in the current iteration and the check node message corresponding to each non-zero sub-matrix of the current layer in the previous iteration.

The check node message processing circuit 504 is configured to: obtain the check node message corresponding to each non-zero sub-matrix of the current layer based on the variable node message corresponding to each non-zero sub-matrix of the current layer and the first algorithm.

The posterior probability message processing circuit 505 is configured to: obtain a updated posterior probability message corresponding to each non-zero sub-matrix of the current layer based on the variable node message corresponding to each non-zero sub-matrix of the current layer and the check node message corresponding to each non-zero sub-matrix of the current layer; and sequentially write the updated posterior probability message corresponding to each non-zero sub-matrix of the current layer into the first memory 501 in the first writing order.

In the example of the present disclosure, in the decoding of the current layer, after the posterior probability message corresponding to each non-zero sub-matrix of the current layer is sequentially read from the first memory 501 in the first reading order, the variable node message processing circuit 503 is configured to add the posterior probability message corresponding to each non-zero sub-matrix of the current layer in the current iteration to the negative check node message corresponding to each non-zero sub-matrix of the current layer in the previous iteration, to obtain the variable node message corresponding to each non-zero sub-matrix of the current layer.

The posterior probability message processing circuit 505 is configured to add a variable node message corresponding to each non-zero sub-matrix of the current layer to a check node message corresponding to each non-zero sub-matrix of the current layer, to obtain an updated posterior probability message corresponding to each non-zero sub-matrix of the current layer. After the updated posterior probability message corresponding to each non-zero sub-matrix of the current layer is obtained, the posterior probability message processing circuit 505 is configured to: sequentially write the updated posterior probability message corresponding to each non-zero sub-matrix of the current layer into the first memory 501 in the first writing order.

In some examples, the first algorithm comprises a sum-product algorithm and a mini-sum algorithm.

Figure 17:
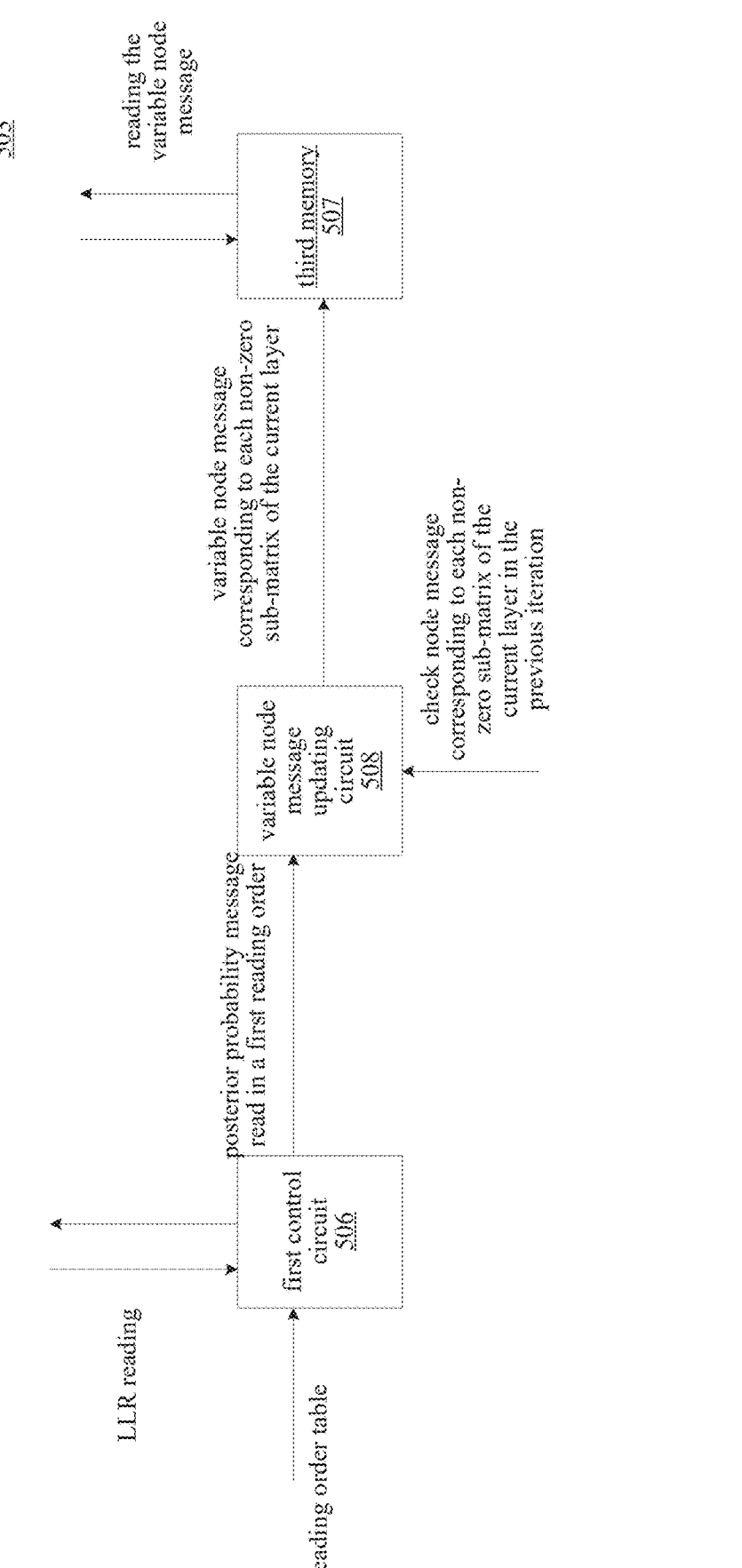
FIG. 17 is a schematic diagram of a structure of a variable node message processing circuit according to an example of the present disclosure.

In some examples, as shown in FIG. 12 and FIG. 16, the decoder further comprises a second memory 509. As shown in FIG. 16 and FIG. 17, the variable node message processing circuit 503 comprises a first control circuit 506, a third memory 507, and a variable node message updating circuit 508.

The first control circuit 506 is configured to obtain a reading order table from the second memory 509; sequentially read a posterior probability message corresponding to each non-zero sub-matrix of the current layer from the first memory 501 in the first reading order in the reading order table.

The variable node message updating circuit 508 is configured to perform a first operation on the posterior probability message corresponding to each non-zero sub-matrix of the current layer in the current iteration and the check node message corresponding to each non-zero sub-matrix of the current layer in the previous iteration, to obtain a variable node message corresponding to each non-zero sub-matrix of the current layer.

The third memory 507 is configured to store the variable node message corresponding to each non-zero sub-matrix of the current layer.

In some examples, the variable node message updating circuit 508 comprises, but is not limited to, a multiplier and an adder.

In some examples, the second memory 509 and the third memory 507 are both volatile memories comprising, but not limited to, random access memory, dynamic random access memory, static random access memory, synchronous dynamic random access memory, double data rate synchronous dynamic random access memory.

The first operation here comprises but is not limited to an addition operation, and the variable node message corresponding to each non-zero sub-matrix of the current layer is obtained by performing an addition operation on the posterior probability message corresponding to each non-zero sub-matrix of the current layer in the current iteration and the negative check node message corresponding to each non-zero sub-matrix of the current layer in the previous iteration.

In some examples, the determination of the first reading order may be obtained via the script software by analyzing the check matrix. In some examples, the information of the first reading order may be embedded in firmware in the memory controller with the information of the check matrix, and written into the second memory 509 in the decoder by the control unit of the memory controller.

In some examples, the second memory 509 further stores flag bit information; the flag bit information is configured to indicate whether a column where each non-zero sub-matrix of the current layer is located is a non-zero sub-matrix in a next layer of the current layer.

Figure 18:
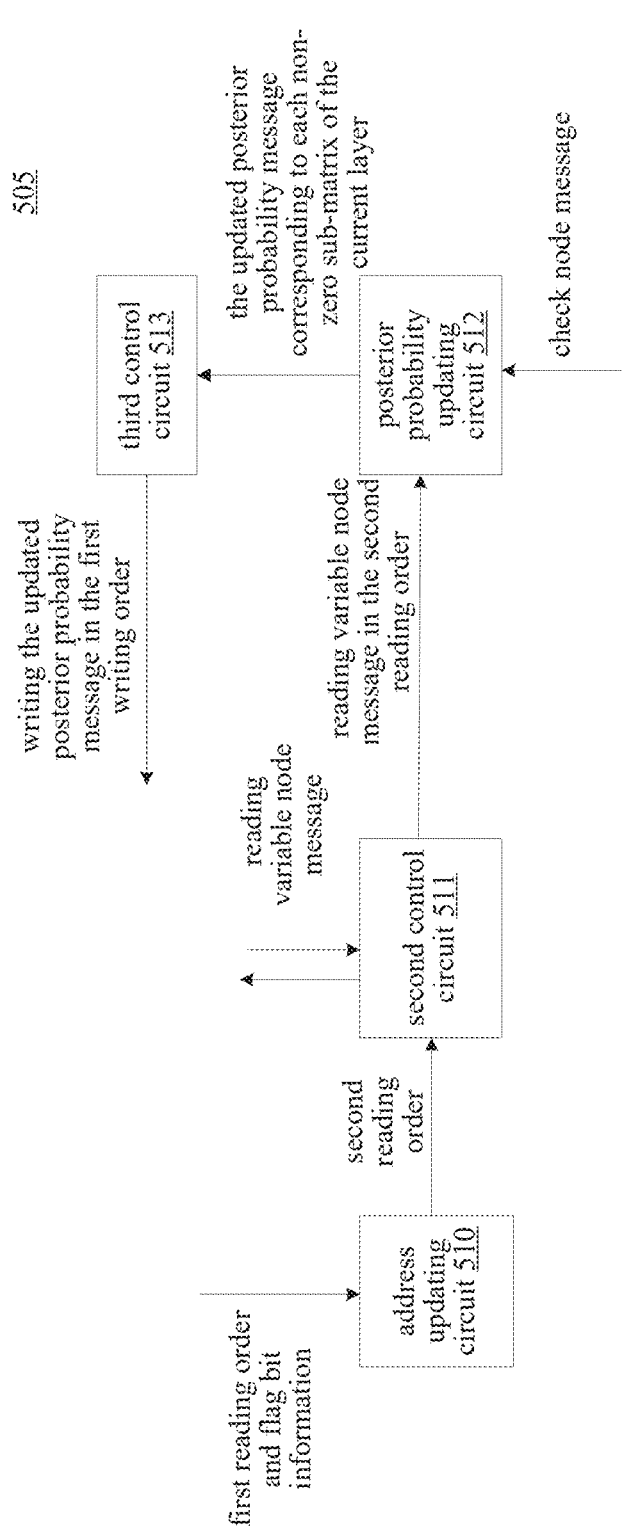
FIG. 18 is a schematic diagram of a structure of a posterior probability message processing circuit according to an example of the present disclosure.

As shown in FIG. 16 and FIG. 18, the posterior probability message processing circuit 505 comprises an address updating circuit 510, a second control circuit 511, a posterior probability updating circuit 512, and a third control circuit 513.

The address updating circuit 510 is configured to generate a second reading order based on the first reading order and the flag bit information. In the second reading order, the variable node message corresponding to the non-zero sub-matrix of the current layer for which the column where the non-zero sub-matrix of the current layer is located is a non-zero sub-matrix in the next layer of the current layer is read first. Then, the variable node message corresponding to the non-zero sub-matrix of the current layer for which the column where the non-zero sub-matrix of the current layer is located is a zero sub-matrix in the next layer of the current layer is read.

The second control circuit 511 is configured to read the variable node message corresponding to each non-zero sub-matrix of the current layer stored in the third memory 507 based on the second reading order.

The posterior probability updating circuit 512 is configured to obtain an updated posterior probability message corresponding to each non-zero sub-matrix of the current layer based on the check node message corresponding to each non-zero sub-matrix of the current layer and the variable node message corresponding to each non-zero sub-matrix of the current layer.

The third control circuit 513 is configured to write the updated posterior probability message corresponding to each non-zero sub-matrix of the current layer into the first memory 501 based on the first writing order; the first writing order is the same as the second reading order.

In some examples, the posterior probability update circuit 512 comprises, but is not limited to, an adder.

In some examples, the flag bit information corresponding to each non-zero sub-matrix of the current layer may be represented by 1-bit data. For example, when a column where a certain non-zero sub-matrix of the current layer is located is a non-zero sub-matrix in the next layer of the current layer, a value of the flag bit information corresponding to the non-zero sub-matrix is 1; and when a column where a certain non-zero sub-matrix of the current layer is located is a zero sub-matrix in the next layer of the current layer, a value of the flag bit information corresponding to the non-zero sub-matrix is 0. Alternatively, when a column where a certain non-zero sub-matrix of the current layer is located is a non-zero sub-matrix in the next layer of the current layer, a value of the flag bit information corresponding to the non-zero sub-matrix is 0; and when a column where a certain non-zero sub-matrix of the current layer is located is a zero sub-matrix in the next layer of the current layer, a value of the flag bit information corresponding to the non-zero sub-matrix is 1.

In some examples, not only the variable node message is stored in the third memory 507, but also the address of the posterior probability message corresponding to the variable node message is stored in the third memory 507. The address updating circuit 510 divides the variable node messages written into the third memory 507 into two queues according to the flag bit information. Here, the first queue is the variable node message corresponding to the non-zero sub-matrix of the current layer for which the column where the non-zero sub-matrix of the current layer is located is a non-zero sub-matrix in the next layer of the current layer, and the second queue is the variable node message corresponding to the non-zero sub-matrix of the current layer for which the column where the non-zero sub-matrix of the current layer is located is a zero sub-matrix in the next layer of the current layer.

The address updating circuit 510 may identify the corresponding flag bit information, and generate the second reading order in which the variable node message of the first queue needs to be read from the third memory 507 first and then the variable node message of the second queue is read.

The second control circuit 511 reads the variable node message corresponding to each non-zero sub-matrix of the current layer stored in the third memory 507 in the second reading order. When the variable node message corresponding to each non-zero sub-matrix of the current layer stored in the third memory 507 is read, the second control circuit 511 also reads the address of the posterior probability message corresponding to the variable node message at the same time, generates a first writing order and propagates along with the posterior probability message, and the third control circuit 513 performs the writing of the posterior probability message according to the first writing order.

In the example of the present disclosure, the first control circuit 506, the second control circuit 511, and the third control circuit 513 may comprise one or more units having a logical operation capability, for example, at least one of a central processing unit (CPU) or a microcontroller unit (MCU), or the like.

The second reading order is an order in which a variable node corresponding to each non-zero sub-matrix of the current layer is read. The second reading order may be arranged in a column number where each non-zero sub-matrix of the current layer is located, for example, in a case where the current layer is the I layer, the second reading order is 16, 3, 8, 13, 1, 4, 14, 9, 11, and 6 sequentially arranged from front to back. The first writing order is an order in which a updated posterior probability message corresponding to each non-zero sub-matrix of the current layer is written. The first writing order may be arranged in a column number where each non-zero sub-matrix of the current layer is located, for example, when the current layer is the I layer, the first writing order is 16, 3, 8, 13, 1, 4, 14, 9, 11, and 6 sequentially arranged from front to back. The first writing order and the second reading order in the foregoing examples being the same may be understood as the order of the column numbers where each non-zero sub-matrix of the current layer are located being the same.

In some examples, as shown in FIG. 12, the decoder further comprises a hard decision circuit 514. The hard decision circuit 514 is configured to: generate a decoding output vector based on an updated posterior probability message corresponding to each non-zero sub-matrix of the current layer; obtain a decoding result after decoding the current layer in the current iteration based on the decoding output vector and the check matrix; and determine whether to stop decoding based on the decoding result, whether the current layer is the last layer of the check matrix, and whether the number of iterations exceeds the iteration number threshold.

In some examples, the hard decision circuit 514 is configured to: determine, based on a first posterior probability message in the updated posterior probability messages corresponding to each non-zero sub-matrix of the current layer being greater than or equal to 0, that an element in the decoding output vector corresponding to the first posterior probability message is 0; determine, according to the first posterior probability message in the posterior probability messages corresponding to each non-zero sub-matrix of the current layer being less than 0, that an element in the decoding output vector corresponding to the first posterior probability message is 1; and perform a second operation on the decoding output vector and the transposed matrix of the check matrix to obtain a decoding result after decoding the current layer in the current iteration; and stop decoding based on the decoding result being 0 or the current number of iterations being equal to the iteration number threshold and the current layer being the last layer of the check matrix.

The decoding output vector comprises a plurality of elements, and each element is determined by a corresponding posterior probability message. The first posterior probability message is any posterior probability message in the posterior probability messages corresponding to each non-zero sub-matrix of the current layer. When the first posterior probability message is greater than or equal to 0, an element in the decoding output vector corresponding to the first posterior probability message is 0; and when the first posterior probability message is less than 0, an element in the decoding output vector corresponding to the first posterior probability message is 1.

In some examples, when a certain sub-matrix of the current layer is a zero sub-matrix, the posterior probability message corresponding to the zero sub-matrix would not be updated in the decoding of the current layer, and the posterior probability message corresponding to the zero sub-matrix still uses the latest posterior probability message of the column where the zero sub-matrix is located. Each sub-matrix of the current layer corresponds to one element in the decoding output vector.

In some examples, the hard decision circuit 514 is further configured to: determine, based on the second posterior probability message in the posterior probability messages corresponding to each non-zero sub-matrix of the current layer being greater than or equal to 0, that an element in the decoding output vector corresponding to the second posterior probability message is 0; and determine, according to the second posterior probability message in the posterior probability messages corresponding to each non-zero sub-matrix of the current layer being less than 0, that an element in the decoding output vector corresponding to the second posterior probability message is 1. The second posterior probability message is any posterior probability message in the posterior probability messages corresponding to each zero sub-matrix of the current layer. When the second posterior probability message is greater than or equal to 0, an element in the decoding output vector corresponding to the second posterior probability message is 0. When the second posterior probability message is less than 0, an element in the decoding output vector corresponding to the second posterior probability message is 1.

After the decoding result after decoding the current layer in the current iteration is obtained, the decoding may be stopped based on the decoding result being 0, or the current number of iterations being equal to the iteration number threshold and the current layer being the last layer of the check matrix.

Figure 19:
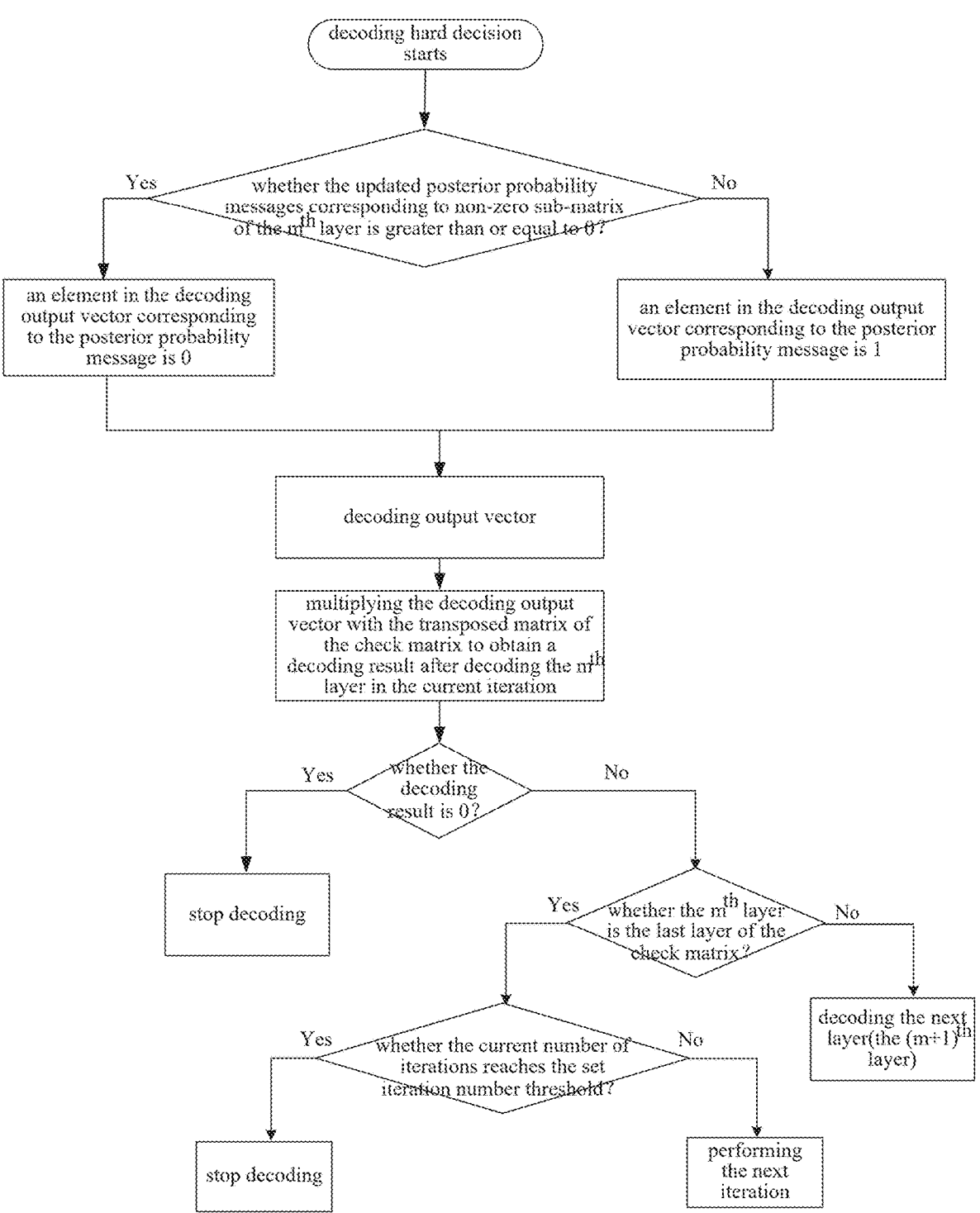
FIG. 19 is a schematic diagram of a process of a hard decision according to an example of the present disclosure.

The process of the decoding hard decision is further described below with reference to FIG. 19 by taking the obtaining of the updated posterior probability message corresponding to each non-zero sub-matrix of the $m^{th}$ layer as an example. In some examples, when the updated posterior probability message corresponding to the non-zero sub-matrix of the ml layer is greater than or equal to 0, the element in the decoding output vector corresponding to the posterior probability message is 0; and when the updated posterior probability message corresponding to the non-zero sub-matrix of the ml layer is less than 0, the element in the decoding output vector corresponding to the posterior probability message is 1. Then, the decoding output vector is multiplied by the transposed matrix of the check matrix to obtain a decoding result after decoding the $m^{th}$ layer in the current iteration.

If the decoding result is 0, the decoding is stopped, and the decoding output vector is used as the decoding output; if the decoding result is not 0, and the $m^{th}$ layer is not the last layer of the check matrix, the next layer (the $(m+1)^{th}$ layer) is coded; if the decoding result is not 0, and the $m^{th}$ layer is the last layer of the check matrix, and the current number of iterations has not reached the set iteration number threshold, the next iteration is performed; and if the decoding result is not 0, and the ml layer is the last layer of the check matrix, and the current number of iterations has reached the set iteration number threshold, the decoding is stopped.

Based on the above decoder, an example of the present disclosure further provides a memory controller a processor configured to receive information of a first reading order. The message updating circuit 502 of the decoder is configured to sequentially read, from the first memory, a posterior probability message corresponding to each non-zero sub-matrix of the current layer according to a first reading order provided in the information of the first reading order.

The memory controller herein may be the memory controller 104 as shown in FIGS. 1, 2, 3, and 6. The processor herein may be understood as the control unit 1043 shown in FIG. 6. Further details about the memory controller are described in detail in the foregoing, and details are not described herein again for brevity.

Based on the above decoder, an example of the present disclosure further provides a memory system including a memory device configured to output read data; and the decoder is configured to decode the codeword to be decoded in the read data.

In some examples, the memory system further comprises an encoder configured to receive the write data and encode the write data. The memory device is further configured to receive the encoded write data.

The structure and composition of the memory system herein may be described in detail with reference to FIGS. 1-6, and details are not described herein again for brevity. The memory device herein may be the memory device 103 as shown in FIGS. 1-6.

Based on the foregoing decoder, an example of the present disclosure further provides a method of decoding. As shown in FIG. 20, the method of decoding my include operations S1001, S1002, and S1003.

At operation S1001, a posterior probability message corresponding to each non-zero sub-matrix of a current layer is sequentially read from a first memory in a first reading order; the first reading order is determined according to a position of each non-zero sub-matrix of a current layer.

At operation S1002, an updated posterior probability message corresponding to each non-zero sub-matrix of the current layer is obtained based on the posterior probability message corresponding to each non-zero sub-matrix of the current layer in a current iteration.

At operation S1003, the updated posterior probability message corresponding to each non-zero sub-matrix of the current layer is sequentially written into the first memory in a first writing order; the first writing order is determined according to the first reading order.

In the example of the present disclosure, when layered iterative decoding is performed, a posterior probability message corresponding to each non-zero sub-matrix of a current layer is sequentially read from the first memory in a first reading order, an updated posterior probability message corresponding to each non-zero sub-matrix of the current layer is sequentially written into the first memory in a first writing order, and the first writing order is determined according to the first reading order. In the example of the present disclosure, by optimizing the reading and writing order of the intra-layer posterior probability message, the read-write conflict of the inter-layer posterior probability message can be avoided, such that the idle time can be effectively reduced, and the decoding efficiency is improved.

In some examples, the first reading order is determined according to a position relationship between each non-zero sub-matrix of the current layer and non-zero sub-matrices of a previous layer of the current layer and a layer before the previous layer of the current layer.

In some examples, the first writing order is determined according to the first reading order and a position relationship between each non-zero sub-matrix of the current layer and a non-zero sub-matrix of a next layer of the current layer.

In some examples, according to the position relationship between the non-zero sub-matrix of each layer and the non-zero sub-matrices of the previous layer and a layer before the previous layer of each layer, the non-zero sub-matrix of each layer is divided into a first category, a second category, and a third category.

In a column where the non-zero sub-matrix in the first category of the current layer is located, both the previous layer of the current layer and the layer before the previous layer of the current layer are zero sub-matrices; in a column where the non-zero sub-matrix in the second category of the current layer is located, the previous layer of the current layer is the zero sub-matrix, and the layer before the previous layer of the current layer is the non-zero sub-matrix; and in a column where the non-zero sub-matrix in the third category of the current layer is located, the previous layer of the current layer is the non-zero sub-matrix.

In some implementations, sequentially reading the posterior probability message corresponding to each non-zero sub-matrix of the current layer from the first memory in the first reading order may include sequentially reading a posterior probability message corresponding to the non-zero sub-matrix belonging to the first category in the non-zero sub-matrices of the current layer, a posterior probability message corresponding to the non-zero sub-matrix belonging to the second category in the non-zero sub-matrices of the current layer, and a posterior probability message corresponding to the non-zero sub-matrix belonging to the third category in the non-zero sub-matrices of the current layer from the first memory in the first reading order.

In some examples, reading the posterior probability message corresponding to the non-zero sub-matrix belonging to the second category in the non-zero sub-matrices of the current layer from the first memory may include sequentially reading a posterior probability message corresponding to a first portion of the non-zero sub-matrix, a posterior probability message corresponding to a second portion of the non-zero sub-matrix, and a posterior probability message corresponding to a third portion of the non-zero sub-matrix from the first memory.

In a column where the first portion of the non-zero sub-matrix is located, the non-zero sub-matrix of the layer before the previous layer of the current layer belongs to the first category; in a column where the second portion of the non-zero sub-matrix is located, the non-zero sub-matrix of the layer before the previous layer of the current layer belongs to the second category; and in a column where the third portion of the non-zero sub-matrix is located, the non-zero sub-matrix of the layer before the previous layer of the current layer belongs to the third category; reading the posterior probability message corresponding to the non-zero sub-matrix belonging to the third category in the non-zero sub-matrices of the current layer from the first memory comprises: sequentially reading a posterior probability message corresponding to a fourth portion of the non-zero sub-matrix, a posterior probability message corresponding to a fifth portion of the non-zero sub-matrix, and a posterior probability message corresponding to a sixth portion of the non-zero sub-matrix from the first memory; in a column where the fourth portion of the non-zero sub-matrix is located, the non-zero sub-matrix of the previous layer of the current layer belongs to the first category; in a column where the fifth portion of the non-zero sub-matrix is located, the non-zero sub-matrix of the previous layer of the current layer belongs to the second category; and in a column where the sixth portion of the non-zero sub-matrix is located, the non-zero sub-matrix of the previous layer of the current layer belongs to the third category.

In some examples, sequentially writing the updated posterior probability message corresponding to each non-zero sub-matrix of the current layer into the first memory in the first writing order may include sequentially writing a posterior probability message corresponding to the non-zero sub-matrix of the current layer for which a column where the non-zero sub-matrix of the current layer is located is a non-zero sub-matrix in a next layer of the current layer, and a posterior probability message corresponding to the non-zero sub-matrix of the current layer for which the column where the non-zero sub-matrix of the current layer is located is a zero sub-matrix in the next layer of the current layer into the first memory.

In some examples, obtaining the updated posterior probability message corresponding to each non-zero sub-matrix of the current layer based on the posterior probability message corresponding to each non-zero sub-matrix of the current layer in the current iteration may include obtaining the updated posterior probability message corresponding to each non-zero sub-matrix of the current layer based on the posterior probability message corresponding to each non-zero sub-matrix of the current layer in the current iteration and a check node message corresponding to each non-zero sub-matrix of the current layer in a previous iteration.

In some examples, as shown in FIG. 21, obtaining the updated posterior probability message corresponding to each non-zero sub-matrix of the current layer based on the posterior probability message corresponding to each non-zero sub-matrix of the current layer in the current iteration and the check node message corresponding to each non-zero sub-matrix of the current layer in the previous iteration may include operations S2001, S2002, and S2003.

At operation S2001, a variable node message corresponding to each non-zero sub-matrix of the current layer may be obtained based on the posterior probability message corresponding to each non-zero sub-matrix of the current layer in the current iteration and the check node message corresponding to each non-zero sub-matrix of the current layer in the previous iteration.

At operation S2002, the check node message corresponding to each non-zero sub-matrix of the current layer may be obtained based on the variable node message corresponding to each non-zero sub-matrix of the current layer and the first algorithm.

A operation S2003, an updated posterior probability message corresponding to each non-zero sub-matrix of the current layer may be obtained based on the variable node message corresponding to each non-zero sub-matrix of the current layer and the check node message corresponding to each non-zero sub-matrix of the current layer.

In some examples, as shown in FIG. 22, obtaining the updated variable node message corresponding to each non-zero sub-matrix of the current layer based on the posterior probability message corresponding to each non-zero sub-matrix of the current layer in the current iteration and the check node message corresponding to each non-zero sub-matrix of the current layer in the previous iteration may include operations S3001 and S3002.

At operation S3001, a reading order table may be obtained from a second memory, and a posterior probability message corresponding to each non-zero sub-matrix of the current layer is sequentially read from the first memory in the first reading order in the reading order table.

At operation S3002, a first operation is performed on the posterior probability message corresponding to each non-zero sub-matrix of the current layer in the current iteration and the check node message corresponding to each non-zero sub-matrix of the current layer in the previous iteration, to obtain the variable node message corresponding to each non-zero sub-matrix of the current layer.

In some examples, as shown in FIG. 23, obtaining the updated posterior probability message corresponding to the current layer based on the variable node message corresponding to the current layer and the check node message corresponding to the current layer may include operations S4001, S4002, S4003, and S4004.

At operation S4001, a second reading order is generated based on the first reading order and flag bit information; and in the second reading order, the variable node message corresponding to the non-zero sub-matrix of the current layer for which a column where the non-zero sub-matrix of the current layer is located is a non-zero sub-matrix in a next layer of the current layer is read first, and then the variable node message corresponding to the non-zero sub-matrix of the current layer for which the column where the non-zero sub-matrix of the current layer is located is a zero sub-matrix in the next layer of the current layer is read.

At operation S4002, the variable node message corresponding to each non-zero sub-matrix of the current layer stored in a third memory is read based on the second reading order.

At operation S4003, the updated posterior probability message corresponding to each non-zero sub-matrix of the current layer is obtained based on the check node message corresponding to each non-zero sub-matrix of the current layer and the variable node message corresponding to each non-zero sub-matrix of the current layer.

At operation S4004, the updated variable node message corresponding to each non-zero sub-matrix of the current layer into the first memory is written based on the first writing order; the first writing order is the same as the second reading order.

In some examples, as shown in FIG. 24, the method may further include operations S5001, S5002, and S5003.

At operation S5001, a decoding output vector is generated based on the updated posterior probability message corresponding to each non-zero sub-matrix of the current layer.

At operation S5002, a decoding result is obtained after decoding the current layer in the current iteration based on the decoding output vector and the check matrix.

At operation S5003, whether to stop decoding is determined based on the decoding result, whether the current layer is the last layer of the check matrix is determined, and whether a number of iterations exceeds a iteration number threshold is determined.

The method of decoding mentioned in the foregoing examples is described in detail in the foregoing examples of the decoder, and for brevity, details are not described herein again.

Based on the foregoing method of decoding, an example of the present disclosure further provides a computer-readable storage medium storing computer programs, wherein the computer programs, when executed by a processor, implement the method of decoding according to any one of the foregoing examples.

Herein, all or part of the processes in the method of decoding in the foregoing examples may be completed by using computer programs for instructing related hardware, and the programs may be stored in a computer-readable storage medium, and the programs, when executed, may comprise a process of the examples of the foregoing methods. The storage medium may comprise a ferromagnetic random access memory (FRAM), a read only memory (ROM), a programmable read-only memory (PROM), an erasable programmable read-only memory (EPROM), an electrically erasable programmable read-only memory (EE-PROM), a flash memory, a magnetic surface memory, an optical disk, or a compact disc read-only memory (CD-ROM), or the like; and the storage medium may further comprise a combination of the foregoing types of memories.

The features disclosed in the several device examples according to the present disclosure may be arbitrarily combined without conflict, to obtain a new device example.

The methods disclosed in the several method examples according to the present disclosure may be arbitrarily combined without conflict, to obtain a new method example.

The above descriptions are only specific aspects of the present disclosure, but the protection scope of the present disclosure is not limited thereto, and changes or replacements that may be easily conceived by any person skilled in the art within the technical scope of the present disclosure should be covered within the protection scope of the present disclosure.

What is claimed is:

1. A decoder, comprising:
a first memory; and
a message updating circuit,
wherein the first memory is configured to store posterior probability messages, and wherein the message updating circuit is configured to:
sequentially read a posterior probability message corresponding to each non-zero sub-matrix of a current layer from the first memory in a first reading order, the first reading order being determined according to a position of each non-zero sub-matrix of the current layer;
obtain an updated posterior probability message corresponding to each non-zero sub-matrix of the current layer based on the posterior probability message corresponding to each non-zero sub-matrix of the current layer in a current iteration; and
sequentially write the updated posterior probability message corresponding to each non-zero sub-matrix of the current layer into the first memory in a first writing order, the first writing order being determined according to the first reading order.

2. The decoder of claim 1, wherein the first reading order is determined according to a position relationship between each non-zero sub-matrix of the current layer and non-zero sub-matrices of a previous layer of the current layer and a layer before the previous layer of the current layer.

3. The decoder of claim 2, wherein the first writing order is determined according to the first reading order and a position relationship between each non-zero sub-matrix of the current layer and a non-zero sub-matrix of a next layer of the current layer.

4. The decoder of claim 3, wherein:
according to a position relationship between the non-zero sub-matrix of each layer and the non-zero sub-matrices of a previous layer and a layer before the previous layer of each layer, the non-zero sub-matrices of each layer are divided into a first category, a second category, and a third category,
in a column where a non-zero sub-matrix in the first category of the current layer is located, both a sub-matrix of the previous layer of the current layer and a sub-matrix of the layer before the previous layer of the current layer are zero sub-matrices,
in a column where a non-zero sub-matrix in the second category of the current layer is located, a sub-matrix of the previous layer of the current layer is a zero sub-matrix, and a sub-matrix of the layer before the previous layer of the current layer is a non-zero sub-matrix,
in a column where a non-zero sub-matrix in the third category of the current layer is located, a sub-matrix of the previous layer of the current layer is a non-zero sub-matrix, and
the message updating circuit is configured to:
sequentially read posterior probability messages corresponding to non-zero sub-matrices belonging to the first category in the non-zero sub-matrices of the current layer, posterior probability messages corresponding to non-zero sub-matrices belonging to the second category in the non-zero sub-matrices of the current layer, and posterior probability messages corresponding to non-zero sub-matrices belonging to the third category in the non-zero sub-matrices of the current layer from the first memory in the first reading order.

5. The decoder of claim 4, wherein:
when the posterior probability messages corresponding to the non-zero sub-matrices belonging to the second category in the non-zero sub-matrices of the current layer are read, the message updating circuit is configured to:
sequentially read posterior probability messages corresponding to a first portion of the non-zero sub-matrices, posterior probability messages corresponding to a second portion of the non-zero sub-matrices, and posterior probability messages corresponding to a third portion of the non-zero sub-matrices from the first memory,
in columns where the first portion of the non-zero sub-matrices are located, the non-zero sub-matrices of the layer before the previous layer of the current layer belong to the first category,
in columns where the second portion of the non-zero sub-matrices are located, the non-zero sub-matrices of the layer before the previous layer of the current layer belong to the second category,
in columns where the third portion of the non-zero sub-matrices are located, the non-zero sub-matrices of the layer before the previous layer of the current layer belong to the third category,
when the posterior probability messages corresponding to the non-zero sub-matrices belonging to the third category in the non-zero sub-matrices of the current layer are read, the message updating circuit is configured to:
sequentially read posterior probability messages corresponding to a fourth portion of the non-zero sub-matrices, posterior probability messages corresponding to a fifth portion of the non-zero sub-matrices, and posterior probability messages corresponding to a sixth portion of the non-zero sub-matrices from the first memory,
in columns where the fourth portion of the non-zero sub-matrices are located, the non-zero sub-matrices of the previous layer of the current layer belong to the first category,
in columns where the fifth portion of the non-zero sub-matrices are located, the non-zero sub-matrices of the previous layer of the current layer belong to the second category, and in columns where the sixth portion of the non-zero sub-matrices are located, the non-zero sub-matrices of the previous layer of the current layer belong to the third category.

6. The decoder of claim 1, wherein:

the message updating circuit is configured to sequentially write, into the first memory, a message, and the message including:

posterior probability messages corresponding to non-zero sub-matrices of the current layer for which in columns where the non-zero sub-matrices of the current layer is located, sub-matrices in a next layer of the current layer are non-zero sub-matrices, and posterior probability messages corresponding to non-zero sub-matrices of the current layer for which in columns where the non-zero sub-matrices of the current layer are located, sub-matrices in the next layer of the current layer are zero sub-matrices.

7. The decoder of claim 1, wherein the message updating circuit is configured to:

obtain the updated posterior probability message corresponding to each non-zero sub-matrix of the current layer based on the posterior probability message corresponding to each non-zero sub-matrix of the current layer in the current iteration and a check node message corresponding to each non-zero sub-matrix of the current layer in a previous iteration.

8. The decoder of claim 7, wherein:

the message updating circuit comprises:

a variable node message processing circuit, a check node message processing circuit, and a posterior probability message processing circuit, the variable node message processing circuit is configured to:

sequentially read the posterior probability message corresponding to each non-zero sub-matrix of the current layer from the first memory in the first reading order; and obtain a variable node message corresponding to each non-zero sub-matrix of the current layer based on the posterior probability message corresponding to each non-zero sub-matrix of the current layer in the current iteration and the check node message corresponding to each non-zero sub-matrix of the current layer in the previous iteration, the check node message processing circuit is configured to:

obtain the check node message corresponding to each non-zero sub-matrix of the current layer based on the variable node message corresponding to each non-zero sub-matrix of the current layer and a first algorithm, and the posterior probability message processing circuit is configured to:

obtain the updated posterior probability message corresponding to each non-zero sub-matrix of the current layer based on the variable node message corresponding to each non-zero sub-matrix of the current layer and the check node message corresponding to each non-zero sub-matrix of the current layer; and sequentially write the updated posterior probability message corresponding to each non-zero sub-matrix of the current layer into the first memory in the first writing order.

9. The decoder of claim 8, wherein the first algorithm comprises a Sum-Product Algorithm and a Min-Sum Algorithm.

10. The decoder of claim 8, further comprising:

a second memory, wherein the variable node message processing circuit comprises a first control circuit, a third memory, and a variable node message updating circuit, wherein the first control circuit is configured to:

obtain a reading order table from the second memory; and sequentially read a posterior probability message corresponding to each non-zero sub-matrix of the current layer from the first memory in the first reading order in the reading order table, wherein the variable node message updating circuit is configured to:

perform a first operation on the posterior probability message corresponding to each non-zero sub-matrix of the current layer in the current iteration and the check node message corresponding to each non-zero sub-matrix of the current layer in the previous iteration, to obtain the variable node message corresponding to each non-zero sub-matrix of the current layer, and wherein the third memory is configured to:

store the variable node message corresponding to each non-zero sub-matrix of the current layer.

11. The decoder of claim 10, wherein:

the second memory is further configured to store flag bit information, the flag bit information is configured to indicate in a column where each non-zero sub-matrix of the current layer is located, whether a sub-matrix of a next layer of the current layer is a non-zero sub-matrix, the posterior probability message processing circuit comprises an address updating circuit, a second control circuit, a posterior probability updating circuit and a third control circuit, the address updating circuit is configured to:

generate a second reading order based on the first reading order and the flag bit information, wherein in the second reading order, variable node messages corresponding to non-zero sub-matrices of the current layer for which in columns where the non-zero sub-matrices of the current layer are located sub-matrices of the next layer of the current layer are non-zero sub-matrices are read first, and then variable node messages corresponding to non-zero sub-matrices of the current layer for which in columns where the non-zero sub-matrices of the current layer are located sub-matrices of the next layer of the current layer are zero sub-matrices are read, the second control circuit is configured to:

read the variable node message corresponding to each non-zero sub-matrix of the current layer stored in the third memory based on the second reading order, the posterior probability updating circuit is configured to:

obtain the updated posterior probability message corresponding to each non-zero sub-matrix of the current layer based on the check node message corresponding to each non-zero sub-matrix of the current layer and the variable node message corresponding to each non-zero sub-matrix of the current layer, and the third control circuit is configured to:

write the updated posterior probability message corresponding to each non-zero sub-matrix of the current layer into the first memory based on the first writing order; the first writing order is the same as the second reading order.

12. The decoder of claim 1, further comprising:

a hard decision circuit configured to:

generate a decoding output vector based on the updated posterior probability message corresponding to each non-zero sub-matrix of the current layer;

obtain a decoding result after decoding the current layer in the current iteration based on the decoding output vector and a check matrix; and determine whether to stop decoding based on the decoding result, whether the current layer is the last layer of the check matrix, and whether a number of iterations exceeds an iteration number threshold.

13. The decoder of claim 12, wherein the hard decision circuit is configured to:

determine, based on a first posterior probability message in the updated posterior probability messages corresponding to each non-zero sub-matrix of the current layer being greater than or equal to 0, that an element in the decoding output vector corresponding to the first posterior probability message is 0;

determine, according to the first posterior probability message in the posterior probability messages corresponding to each non-zero sub-matrix of the current layer being less than 0, that an element in the decoding output vector corresponding to the first posterior probability message is 1;

perform a second operation on the decoding output vector and a transposed matrix of the check matrix to obtain a decoding result after decoding the current layer in the current iteration; and stop decoding based on the decoding result being 0 or a current number of iterations being equal to the iteration number threshold and the current layer being the last layer of the check matrix.

14. A memory system, comprising:

a memory device configured to output read data; and a decoder, comprising:

a first memory; and a message updating circuit, wherein the first memory is configured to store posterior probability messages, wherein the message updating circuit is configured to:

sequentially read a posterior probability message corresponding to each non-zero sub-matrix of a current layer from the first memory in a first reading order, the first reading order being determined according to a position of each non-zero sub-matrix of the current layer;

obtain an updated posterior probability message corresponding to each non-zero sub-matrix of the current layer based on the posterior probability message corresponding to each non-zero sub-matrix of the current layer in a current iteration; and sequentially write the updated posterior probability message corresponding to each non-zero sub-matrix of the current layer into the first memory in a first writing order, the first writing order being determined according to the first reading order, and wherein the decoder is configured to decode a codeword to be decoded in the read data.

15. The memory system of claim 14, further comprising:

an encoder configured to receive write data and encode the write data, wherein the memory device is further configured to receive the encoded write data.

16. A method of decoding, comprising:

sequentially reading a posterior probability message corresponding to each non-zero sub-matrix of a current layer from a first memory in a first reading order, the first reading order being determined according to a position of each non-zero sub-matrix of a current layer;

obtaining an updated posterior probability message corresponding to each non-zero sub-matrix of the current layer based on the posterior probability message corresponding to each non-zero sub-matrix of the current layer in a current iteration; and sequentially writing the updated posterior probability message corresponding to each non-zero sub-matrix of the current layer into the first memory in a first writing order, the first writing order being determined according to the first reading order.

17. The method of claim 16, wherein the first reading order is determined according to a position relationship between each non-zero sub-matrix of the current layer and non-zero sub-matrices of a previous layer of the current layer and a layer before the previous layer of the current layer.

18. The method of claim 17, wherein the first writing order is determined according to the first reading order and a position relationship between each non-zero sub-matrix of the current layer and a non-zero sub-matrix of a next layer of the current layer.

19. The method of claim 18, wherein:

according to a position relationship between the non-zero sub-matrix of each layer and the non-zero sub-matrices of the previous layer and a layer before the previous layer of each layer, the non-zero sub-matrices of each layer are divided into a first category, a second category, and a third category, in a column where a non-zero sub-matrix in the first category of the current layer is located, both a sub-matrix of the previous layer of the current layer and a sub-matrix of the layer before the previous layer of the current layer are zero sub-matrices, in a column where a non-zero sub-matrix in the second category of the current layer is located, a sub-matrix of the previous layer of the current layer is the zero sub-matrix, and a sub-matrix of the layer before the previous layer of the current layer is a non-zero sub-matrix, in a column where a non-zero sub-matrix in the third category of the current layer is located, a sub-matrix of the previous layer of the current layer is a non-zero sub-matrix, and the sequentially reading the posterior probability message corresponding to each non-zero sub-matrix of the current layer from the first memory in the first reading order comprises:

sequentially reading posterior probability messages corresponding to non-zero sub-matrices belonging to the first category in the non-zero sub-matrices of the current layer, posterior probability messages corresponding to non-zero sub-matrices belonging to the second category in the non-zero sub-matrices of the current layer, and posterior probability messages corresponding to non-zero sub-matrices belonging to the third category in the non-zero sub-matrices of the current layer from the first memory in the first reading order.

20. The method of claim 19, wherein:

reading posterior probability messages corresponding to the non-zero sub-matrices belonging to the second category in the non-zero sub-matrices of the current layer from the first memory comprises:

sequentially reading posterior probability messages corresponding to a first portion of the non-zero sub-matrices, posterior probability messages corresponding to a second portion of the non-zero sub-matrices, and posterior probability messages corresponding to a third portion of the non-zero sub-matrices from the first memory, in columns where the first portion of the non-zero sub-matrices are located, the non-zero sub-matrices of the layer before the previous layer of the current layer belong to the first category, in columns where the second portion of the non-zero sub-matrices are located, the non-zero sub-matrices of the layer before the previous layer of the current layer belong to the second category, in columns where the third portion of the non-zero sub-matrices are located, the non-zero sub-matrices of the layer before the previous layer of the current layer belong to the third category, and reading posterior probability messages corresponding to the non-zero sub-matrices belonging to the third category in the non-zero sub-matrices of the current layer from the first memory comprises:

sequentially reading posterior probability messages corresponding to a fourth portion of the non-zero sub-matrices, posterior probability messages corresponding to a fifth portion of the non-zero sub-matrices, and posterior probability messages corresponding to a sixth portion of the non-zero sub-matrices from the first memory, in columns where the fourth portion of the non-zero sub-matrices are located, the non-zero sub-matrices of the previous layer of the current layer belong to the first category, in columns where the fifth portion of the non-zero sub-matrices are located, the non-zero sub-matrices of the previous layer of the current layer belong to the second category, and in columns where the sixth portion of the non-zero sub-matrices are located, the non-zero sub-matrices of the previous layer of the current layer belong to the third category.

* * * * *